(12) United States Patent
Tabata et al.

(10) Patent No.: US 8,557,904 B2
(45) Date of Patent: Oct. 15, 2013

(54) SEALING DEVICE

(75) Inventors: Masahiro Tabata, Kashiwara (JP);
Kazutoshi Yamamoto, Yamatokoriyama (JP); Kasumi Yamamoto, legal representative, Yamatokoriyama (JP); Michitoshi Mitsumaru, Sakurai (JP); Daisuke Ozaki, Kashiba (JP); Atsuhito Tada, Tokushima (JP); Eiji Namira, Tokushima (JP)

(73) Assignees: Jtekt Corporation, Osaka-Shi (JP);
Koyo Sealing Techno Co., Ltd., Itano-Gun, Tokushima (JP)

( * ) Notice: Subject to any disclaimer, the term of this patent is extended or adjusted under 35 U.S.C. 154(b) by 265 days.

(21) Appl. No.: 12/734,721

(22) PCT Filed: Nov. 19, 2008

(86) PCT No.: PCT/JP2008/070984
§ 371 (c)(1),
(2), (4) Date: May 19, 2010

(87) PCT Pub. No.: WO2009/066678
PCT Pub. Date: May 28, 2009

(65) Prior Publication Data
US 2010/0295254 A1    Nov. 25, 2010

(30) Foreign Application Priority Data
Nov. 20, 2007 (JP) ................................ P2007-300871

(51) Int. Cl.
*C08K 5/09* (2006.01)
(52) U.S. Cl.
USPC ........... 524/394; 524/448; 524/456; 277/549; 277/592

(58) Field of Classification Search
USPC .................. 277/550, 549; 524/394, 448, 456
See application file for complete search history.

(56) References Cited

U.S. PATENT DOCUMENTS 3,022,081 A * 2/1962 Kosatka ......................... 277/353
3,479,728 A * 11/1969 Micai et al. ..................... 29/450

(Continued)

FOREIGN PATENT DOCUMENTS

| CN | 1142842 A | 2/1997 |
|---|---|---|
| JP | 1-76325 | 5/1989 |

(Continued)

OTHER PUBLICATIONS

Chinese Office Action dated Jul. 4, 2012 with a partial English translation thereof.

(Continued)

*Primary Examiner* — Thomas Beach
*Assistant Examiner* — Eugene G Byrd
(74) *Attorney, Agent, or Firm* — McGinn IP Law Group, PLLC

(57) ABSTRACT

The invention provides a sealing device in which adhesion of an elastic member used for the sealing device is controlled, and a coefficient of friction against a member sliding against the sealing device is reduced.

A sealing device includes a first member 1, a second member 2 moving relative to the first member, and an elastic member 3 fixed to the first member 1 and sliding against the second member 2, and is characterized in that: the elastic member 3 is made of a rubber composition containing a metal soap, an organic acid amide and an oil-containing particle.

13 Claims, 15 Drawing Sheets

(56) References Cited

U.S. PATENT DOCUMENTS

| | | | |
|---|---|---|---|
| 4,434,985 A * | 3/1984 | Sonnerat | 277/353 |
| 4,863,292 A * | 9/1989 | Dreschmann et al. | 384/482 |
| 4,898,395 A * | 2/1990 | Kawase | 277/615 |
| 4,974,860 A * | 12/1990 | Anzue et al. | 277/424 |
| 5,430,103 A * | 7/1995 | Ohata et al. | 525/194 |
| 5,431,413 A * | 7/1995 | Hajzler | 277/317 |
| 5,891,941 A * | 4/1999 | Tanaka et al. | 524/232 |
| 5,975,534 A * | 11/1999 | Tajima et al. | 277/353 |
| 6,168,315 B1 * | 1/2001 | Nagase et al. | 384/448 |
| 6,592,264 B2 | 7/2003 | Yabe et al. | |
| 6,637,754 B1 | 10/2003 | Ohtsuki et al. | |
| 6,817,769 B2 * | 11/2004 | Johnson et al. | 384/478 |
| 6,921,083 B2 * | 7/2005 | Yasui et al. | 277/572 |
| 7,582,352 B2 * | 9/2009 | Kobayashi et al. | 428/319.3 |
| 7,926,817 B2 * | 4/2011 | Yamamoto et al. | 277/551 |
| 2003/0057656 A1 | 3/2003 | Gorman | |
| 2003/0189298 A1 * | 10/2003 | Mizuta et al. | 277/549 |
| 2004/0201178 A1 * | 10/2004 | Yamamoto | 277/549 |
| 2004/0256812 A1 * | 12/2004 | Terazawa | 277/549 |
| 2005/0001385 A1 * | 1/2005 | Mizuta et al. | 277/549 |
| 2005/0104302 A1 * | 5/2005 | Matsui et al. | 277/562 |
| 2006/0128857 A1 * | 6/2006 | Otaka et al. | 524/322 |
| 2006/0267292 A1 * | 11/2006 | Yamamoto | 277/549 |
| 2007/0152403 A1 * | 7/2007 | Matsui et al. | 277/549 |
| 2007/0152404 A1 * | 7/2007 | Matsui et al. | 277/549 |
| 2007/0222161 A1 * | 9/2007 | Voydatch et al. | 277/551 |
| 2008/0023921 A1 * | 1/2008 | Yamamoto | 277/549 |
| 2008/0084031 A1 * | 4/2008 | Kageyama et al. | 277/549 |
| 2008/0217863 A1 * | 9/2008 | Beatty | 277/549 |
| 2009/0020960 A1 * | 1/2009 | Yamamoto | 277/549 |
| 2010/0056694 A1 * | 3/2010 | Hirose et al. | 524/448 |
| 2010/0164184 A1 * | 7/2010 | Yamamoto | 277/550 |
| 2010/0311908 A1 * | 12/2010 | Hirose et al. | 525/194 |
| 2011/0291365 A1 * | 12/2011 | Hirose | 277/500 |

FOREIGN PATENT DOCUMENTS

| | | |
|---|---|---|
| JP | 7-196879 | 8/1995 |
| JP | 7-196879 A | 8/1995 |
| JP | 2002-372062 | 12/2002 |
| JP | 2007-2223 | 1/2007 |
| JP | 2007-2223 A | 1/2007 |
| JP | 2007-250603 | 9/2007 |
| JP | 2007-250603 A | 9/2007 |

OTHER PUBLICATIONS

Japanese Office Action dated Aug. 6, 2012 with an English translation thereof.
Extended European Search Report dated Oct. 16, 2012.

* cited by examiner

SEALING DEVICE

TECHNICAL FIELD

The present invention relates to a sealing device. In more detail, the invention relates to a sealing device capable be suitably used for, for example, a wheel bearing which is used for supporting an automobile wheel, and the like.

BACKGROUND ART

In general, a rubber composition having an additive compounded in a nitrile rubber is used for an elastic member used for a sealing device which is used for a rolling bearing for automobile wheels. However, since the rolling bearing for automobile wheels is used outdoors, it may be exposed to a large quantity of dusts or splashed with rainwater or water when washed, and furthermore, it may be dipped in muddy water. As a sealing device having a good sealing property even in such a severe state, there is proposed a sealing device having an elastic member made of a vulcanizable rubber composition having carbon black compounded in a carboxylated acrylonitrile butadiene rubber (see, for example, Patent Document 1).

Patent Document 1: JP-A-2002-372062

DISCLOSURE OF THE INVENTION

Problems that the Invention is to Solve

However, in general, a rubber which is used for an elastic member largely varies in its coefficient of friction depending upon the lubrication state, and there is a possibility that when it becomes in a poor lubrication state and a dry state, its adhesion to the surface of a contact-mating member increases, or it bites into fine recesses and projections existing on the surface of the contact-mating member. Also, there is a possibility that the coefficient of friction becomes abruptly large due to viscoelasticity that the rubber itself possesses. In the light of the above, in the case where the coefficient of friction becomes abruptly large, there is a possibility that abnormal abrasion occurs, or an abnormal vibration or noise occurs due to so-called stick-slip. As a result, there is a concern that this sealing device is largely damaged, or it adversely affects the surrounding environment by a noise or vibration.

In view of the foregoing conventional technologies, the invention has been made. A problem of the invention is to provide a sealing device in which adhesion of an elastic member used for the sealing device is controlled, and a coefficient of friction against a member sliding against the sealing device is reduced.

Means for Solving the Problems

The invention is concerned with:
(1) A sealing device including a first member, a second member moving relative to the first member, and
an elastic member fixed to the first member and sliding against the second member,
which is characterized in that:
the elastic member is made of a rubber composition containing a metal soap, an organic acid amide and an oil-containing particle;
(2) The sealing device as set forth above in (1), wherein the metal soap is lithium stearate;
(3) The sealing device as set forth above in (1) or (2), wherein a content of the metal soap is 0.05% by mass or more;
(4) The sealing device as set forth above in any one of (1) to (3), wherein the organic acid amide is an unsaturated fatty acid monoamide;
(5) The sealing device as set forth above in (4), wherein the unsaturated fatty acid monoamide is oleic acid monoamide;
(6) The sealing device as set forth above in any one of (1) to (5), wherein a content of the organic acid amide is 0.5% by mass or more;
(7) The sealing device as set forth above in any one of (1) to (6), wherein the oil-containing particle is a silicone oil-supported silica particle; and
(8) The sealing device as set forth above in any one of (1) to (7), wherein a content of the oil-containing particle is 0.5% by mass or more.

ADVANTAGES OF THE INVENTION

The sealing device of the invention gives rise to such an effect that adhesion of an elastic member used for this is controlled, and a coefficient of friction against a member sliding against the sealing device is reduced.

BEST MODES FOR CARRYING OUT THE INVENTION

The sealing device of the invention is a sealing device including a first member, a second member moving relative to the first member and an elastic member fixed to the first member and sliding against the second member, which is characterized in that the elastic member is made of a rubber composition containing a metal soap, an organic acid amide and an oil-containing particle.

Figure 1:
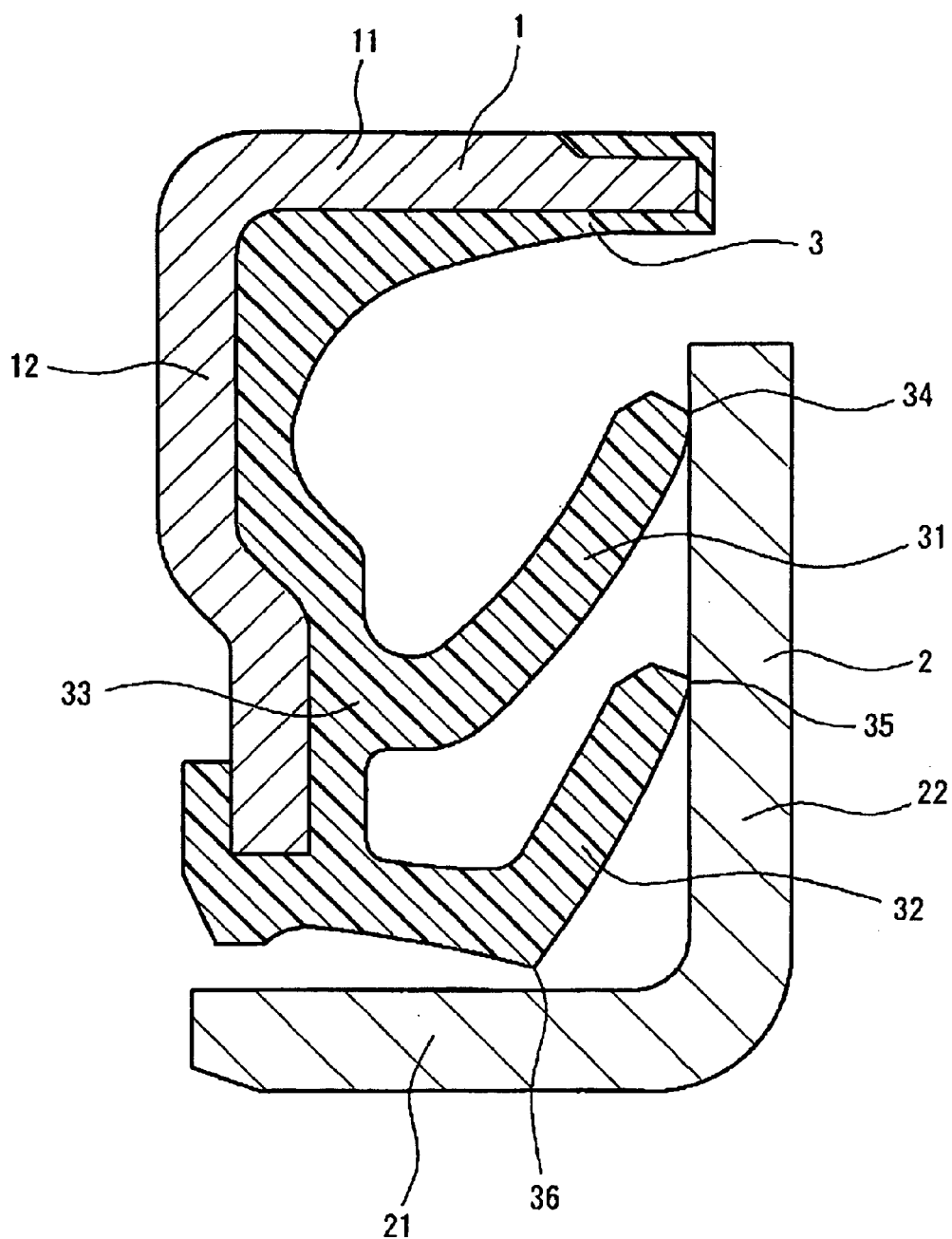
FIG. 1 is a diagrammatic sectional view showing an embodiment of a sealing device of the invention.
Figure 2:
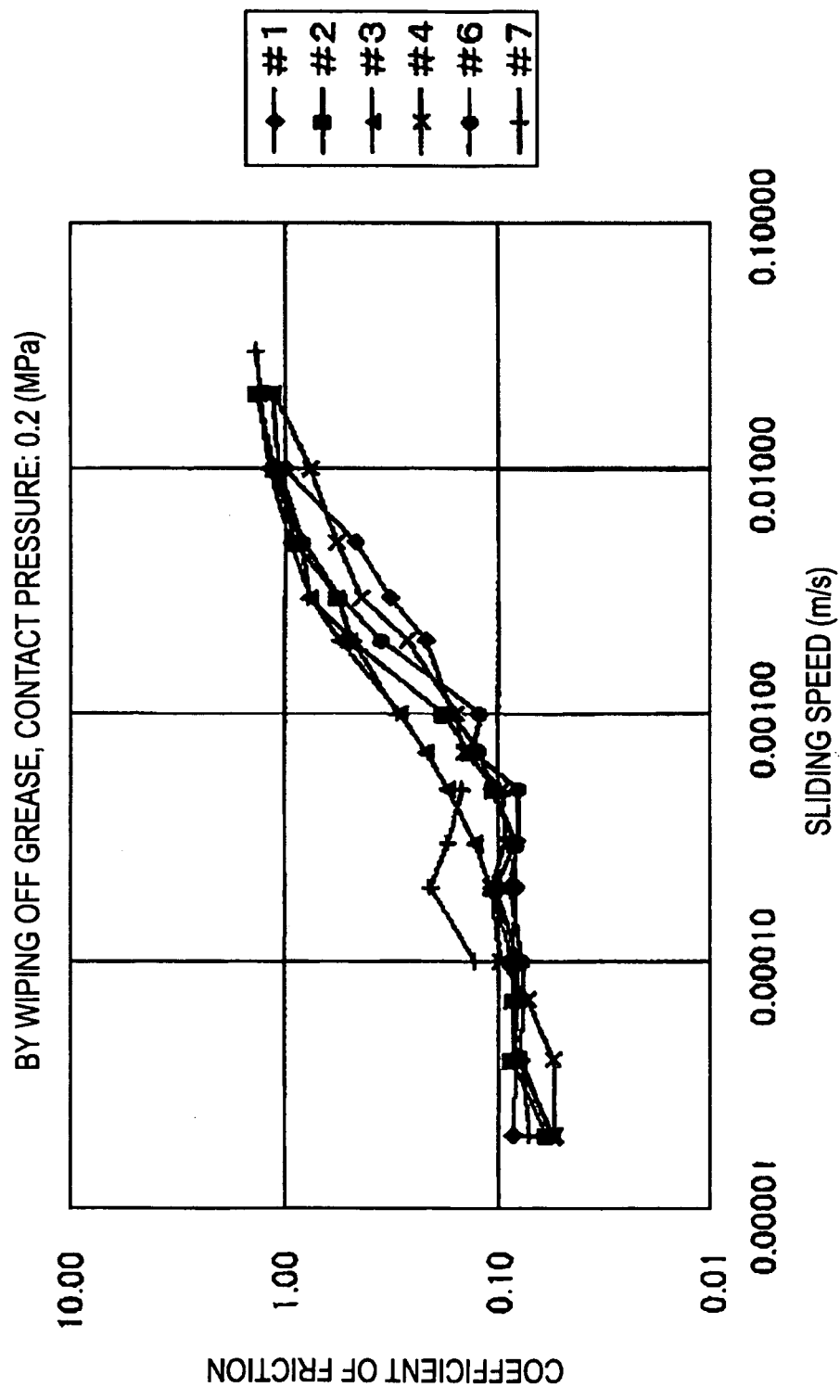
FIG. 2 is a graph showing a relationship between a sliding speed and a coefficient of friction when a contact pressure of a sample made of a rubber composition obtained in Example 1 is 0.2 MPa, and grease is wiped off.
Figure 3:
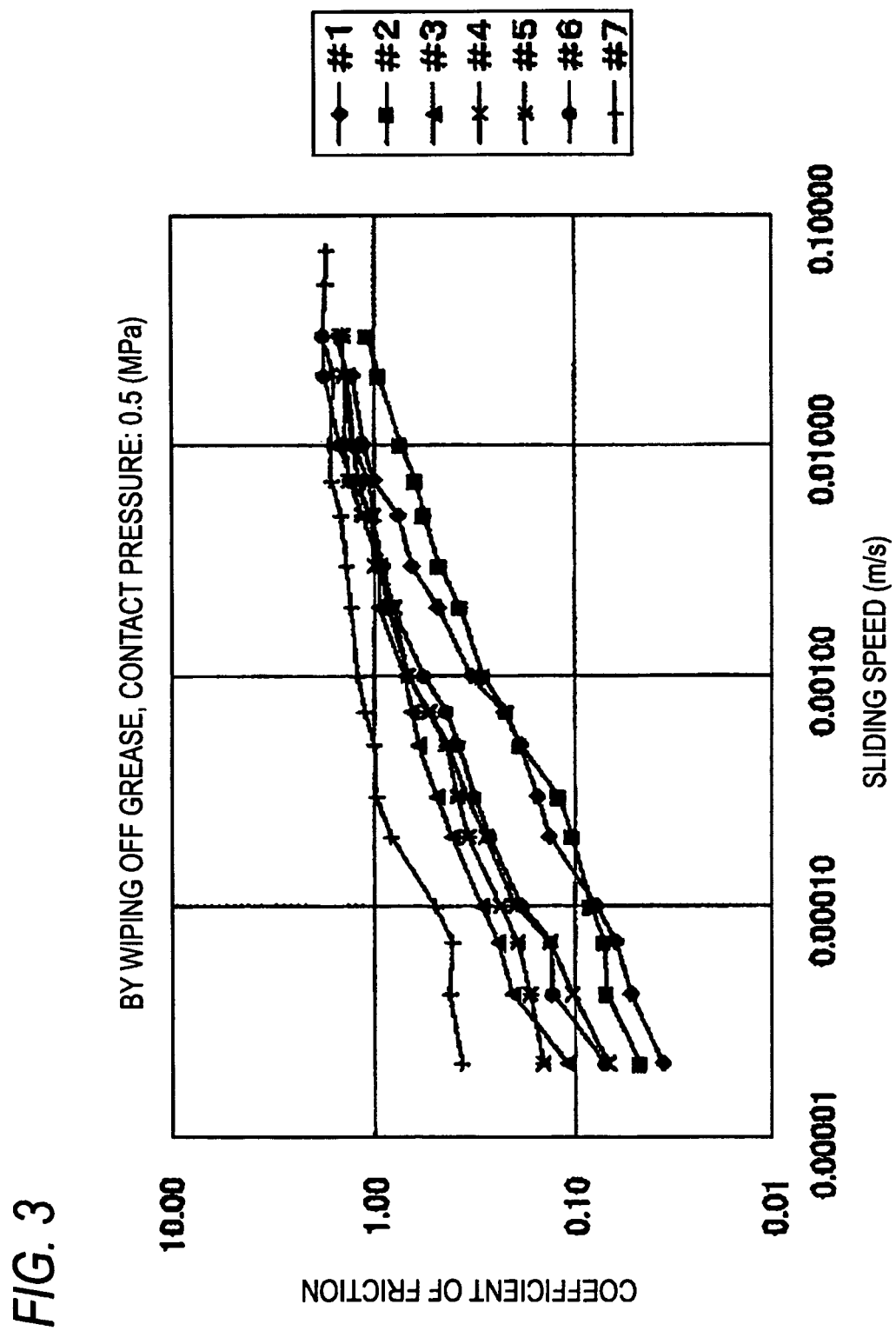
FIG. 3 is a graph showing a relationship between a sliding speed and a coefficient of friction when a contact pressure of a sample made of a rubber composition obtained in Example 1 is 0.5 MPa, and grease is wiped off.

FIG. 1 is a diagrammatic sectional view showing an embodiment of the sealing device of the invention. As shown in FIG. 1, the sealing device of the invention is configured to include a first member 1, a second member 2 moving relative to the first member 1 and an elastic member 3 fixed to the first member 1 and sliding against the second member 2.

The first member 1 is formed in a ring shape and is, for example, formed by subjecting a metal plate such as a low carbon steel plate, etc. to blanking such as press working, etc. or plastic working. The first member 1 is, for example, provided with an outside diameter side cylindrical part 11 which can be freely fitted internally and fixed onto the internal circumferential surface of an end of an outer ring-corresponding member (not shown) constituting a rolling bearing and an inside ring part 12 which is bent from an inner end edge in the axial direction of the outside diameter side cylindrical part 11 inwardly in the radial direction, and its sectional shape is substantially L-shaped.

The second member 2 is formed in a ring shape and is, for example, formed by subjecting a metal plate having excellent corrosion resistance such as a stainless steel plate, etc. to press working, blanking, plastic working, etc. The second member 2 is provided with an inside diameter cylindrical part 21 which can be freely fitted externally and fixed onto the external end circumferential surface of an inner ring (not shown) constituting a rolling bearing and an outside ring part 22 which is bent from an outer end edge in the axial direction of the inside diameter side cylindrical part 21 outwardly in the radial direction, and its sectional shape is substantially L-shaped.

The elastic member 3 is formed in a ring shape and provided with a first axial seal lip 31 in the outside in the radial direction and also with a second axial seal lip 32 in the inside in the radial direction; and its base end part 33 is united with and fixed to the first member 1. By bringing a tip edge 34 of the first axial seal lip 31 into sliding contact with the inside surface of the outside ring part 22 constituting the second member 2 and also bringing a tip edge 35 of the second axial seal lip 32 into sliding contact with the inside surface of the outside ring part 22 constituting the second member 2, leakage of grease enclosed in the inside is prevented from occurring; and invasion of dusts, water, muddy water, etc. into the inside of the bearing from the outside is prevented from occurring. Also, when the tip edge 35 of the second axial seal lip 32 is abraded, a projected edge 36 is made to come into sliding contact with the inside diameter side cylindrical part 21 constituting the second member 2 due to elasticity of the second axial seal lip 32.

The invention has one important characteristic feature in the point that the elastic member 3 is made of a rubber composition containing a metal soap, an organic acid amide and an oil-containing particle. In the light of the above, in the invention, the elastic member 3 is constituted of the foregoing rubber composition, and a metal soap and an organic acid amide are used jointly with an oil-containing particle; and therefore, there are revealed such excellent effects that the adhesion of the elastic member is controlled due to a synergistic effect by this joint use and that a coefficient of friction against the member sliding against the sealing device is remarkably reduced.

Examples of the metal soap include metal soaps including an alkali metal such as lithium, sodium, potassium, etc., an alkaline earth metal such as calcium, strontium, barium, etc., or a metal such as aluminum, zinc, copper, lead, etc.

Specific examples of the metal soap include alkali metal salts, alkaline earth metal salts or aluminum salts of an aliphatic monocarboxylic acid having from 12 to 24 carbon atoms, which may have a hydroxyl group; calcium complex salts of an aliphatic monocarboxylic acid having from 12 to 24 carbon atoms, which may have a hydroxyl group, and an aliphatic monocarboxylic acid having from 2 to 11 carbon atoms; aluminum complex salts of an aliphatic monocarboxylic acid having from 12 to 24 carbon atoms and an aromatic monocarboxylic acid having from 7 to 24 carbon atoms; lithium complex salts of an aliphatic monocarboxylic acid having from 12 to 24 carbon atoms, which may have a hydroxyl group, and at least one member selected from the group consisting of an aliphatic dicarboxylic acid having from 2 to 12 carbon atoms or a diester thereof, an aromatic monocarboxylic acid having from 7 to 24 carbon atoms or an ester thereof, a phosphoric acid ester and a boric acid ester; and so on. However, it should not be construed that the invention is limited to these exemplified materials.

Examples of the metal soap which is suitable include lithium metal soaps such as lithium stearate, lithium behenate, lithium 12-hydroxystearate, etc.; calcium metal soaps such as calcium laurate, calcium stearate, calcium 12-hydroxystearate, etc.; zinc soaps such as zinc laurate, zinc stearate, zinc behenate, etc.; barium soaps such as barium stearate, etc.; magnesium soaps such as magnesium stearate, magnesium behenate, magnesium 12-hydroxystearate, etc.; and so on. Of these, from the viewpoints of controlling the adhesion of the elastic member and reducing a coefficient of friction, lithium metal soaps are preferable, and lithium stearate is more preferable.

From the viewpoints of controlling the adhesion of the elastic member and reducing a coefficient of friction against the member sliding against the sealing device, a content of the metal soap in the rubber composition is preferably 0.05% by mass or more, and more preferably 0.1% by mass or more. When the content of the metal soap in the rubber composition is too large, a significant enhancement of the effect cannot be expected, and the economy tends to be rather lowered; and therefore, the content of the metal soap in the rubber composition is preferably not more than 5% by mass, more preferably not more than 3% by mass, and further preferably not more than 2% by mass.

Examples of the organic acid amide include unsaturated fatty acid monoamides such as oleic acid monoamide, etc.; saturated fatty acid bisamides such as ethylenebisstearic acid amide, etc.; substituted amides such as N-stearyl erucic acid amide, etc.; and so on. Of these, from the viewpoints of controlling the adhesion of the elastic member and reducing a coefficient of friction, unsaturated fatty acid monoamides are preferable, and oleic acid monoamide is more preferable.

From the viewpoints of controlling the adhesion of the elastic member and reducing a coefficient of friction against the member sliding against the sealing device, a content of the organic acid amide in the rubber composition is preferably 0.5% by mass or more, and more preferably 1% by mass or more. When the content of the organic acid amide in the rubber composition is too large, a significant enhancement of the effect cannot be expected, and the economy tends to be rather lowered; and therefore, the content of the organic acid amide in the rubber composition is preferably not more than 5% by mass, more preferably not more than 3% by mass, and further preferably not more than 2% by mass.

Examples of the oil-containing particle include a silicone oil-supported silica particle and so on. From the viewpoints of controlling the adhesion of the elastic member and reducing a coefficient of friction against the member sliding against the sealing device, a particle size of the silica particle is preferably within the range of from 10 to 300 µm. Dimethylpolysiloxane is preferable as the silicone oil. From the viewpoints of controlling the adhesion of the elastic member and reducing a coefficient of friction against the member sliding against the sealing device, a kinematic viscosity of dimethylpolysiloxane at 25° C. is preferably from 10,000 to 100,000 cs, and more preferably from 30,000 to 80,000 cs. From the viewpoints of controlling the adhesion of the elastic member and reducing a coefficient of friction against the member sliding against the sealing device, a content of the silicone oil in the silicone oil-supported silica particle is preferably from 30 to 70% by mass, and more preferably from 50 to 65% by mass.

Dimethylpolysiloxane-supported silica is commercially available with ease, and representative examples thereof include trade name: TORAYFIL F-202, manufactured by Dow Corning Toray Co., Ltd.; and so on.

From the viewpoints of controlling the adhesion of the elastic member and reducing a coefficient of friction against the member sliding against the sealing device, a content of the oil-containing particle in the rubber composition is preferably 0.5% by mass or more, more preferably 1% by mass or more, and further preferably 2% by mass or more. When the content of the oil-containing particle in the rubber composition is too large, a significant enhancement of the effect cannot be expected, and the economy tends to be rather lowered; and therefore, the content of the oil-containing particle in the rubber composition is preferably not more than 10% by mass, more preferably not more than 5% by mass, and further preferably not more than 4% by mass.

Examples of a rubber component which is used for the rubber composition include a nitrile rubber (NBR), a hydrogenated nitrile rubber (HNBR), an isoprene rubber (IR), a butadiene rubber (BR), a styrene-butadiene rubber (SBR), a chloroprene rubber (CR), an acrylic rubber (ACM), a silicone rubber (VMQ), a fluorine rubber (FKM) and so on. Of these, a nitrile rubber (NBR) is preferable.

The rubber composition is obtained by heating a rubber component, a metal soap, an organic acid amide and an oil-containing particle to melt the rubber component and kneading the mixture so as to have a uniform composition.

If desired, the rubber composition may be compounded with an appropriate amount of an additive, for example, a filler, a vulcanizer, a vulcanization accelerator, a vulcanization-accelerating assistant, an anti-aging agent, a reinforcing agent, a plasticizer, a coupling agent, a processing assistant, a conductivity-imparting agent, an abrasion improver, etc. within the range where the purpose of the invention is not hindered.

The elastic member can be formed by filling the kneaded rubber composition within a forming die having a shape corresponding to a shape of the elastic member and subjecting it to vulcanization and compression molding.

The thus obtained elastic member is constituted of the foregoing rubber composition, and therefore, it gives rises to excellent effects for controlling the adhesion and reducing a coefficient of friction against the member sliding against the sealing device.

In consequence, in view of the fact that the sealing device of the invention using this elastic member is controlled in the adhesion of the elastic member and reduced in a coefficient of friction against the member sliding against the sealing device, it can be suitably used for, for example, a wheel bearing which is used for supporting an automobile wheel, and the like.

EXAMPLES

Next, the invention is described in more detail with reference to the following Examples, but it should not be construed that the invention is limited to these Examples.

Example 1

Details of an additive used in Example 1 are those shown in the following Table 1.

TABLE 1

| Additive No. | Type | | Material name | Molecular weight | Melting point (° C.) |
| --- | --- | --- | --- | --- | --- |
| 1 | Metal soap | Li metal soap | Lithium stearate | 289 | 216 |
| 2 | Organic acid amide | Unsaturated fatty acid monoamide | Oleic acid amide (purified oleic acid amide) | 281 | 75 |
| 3 | | Substituted amide | N-Stearyl erucic acid amide | 589 | 69 |
| 4 | | Saturated fatty acid bisamide | Ethylenebisstearic acid amide | 592 | 145 |

TABLE 1-continued

| | | | | | |
|---|---|---|---|---|---|
| 5 | Urea | Substituted urea | Xylylene bisstearyl urea | 726 | 166 |
| 6 | | Substituted urea | Diphenylmethane bisstearyl urea | 802 | 206 |

| Additive No. | Number of carboxyl bond, amide bond or urea bond in one molecule | Number of long chain in one molecule | Number of carboxyl bond, amide bond or urea bond per gram | Number of long chain per gram | Trade name |
|---|---|---|---|---|---|
| 1 | 1 | 1 | 2.1E+21 | 2.1E+21 | Trade name: S-7000, manufactured by Sakai Chemical Industry Co., Ltd. |
| 2 | 1 | 1 | 2.1E+21 | 2.1E+21 | Trade name: DIAMID O-220, manufactured by Nippon Kasei Chemical Co., Ltd. |
| 3 | 1 | 2 | 1.0E+21 | 2.0E+21 | Trade name: NIKKAMIDE SE, manufactured by Nippon Kasei Chemical Co., Ltd. |
| 4 | 2 | 3 | 2.0E+21 | 3.1E+21 | Trade name: SLIPAX E, manufactured by Nippon Kasei Chemical Co., Ltd. |
| 5 | 2 | 3 | 1.7E+21 | 2.5E+21 | Trade name: HAKREEN SX, manufactured by Nippon Kasei Chemical Co., Ltd. |
| 6 | 2 | 3 | 1.5E+21 | 2.3E+21 | Trade name: HAKREEN SM, manufactured by Nippon Kasei Chemical Co., Ltd. |

3 parts by mass of the foregoing additive and 97 parts by mass of NBR [containing a silica based additive (not an oil-containing particle) and a vulcanizer] were kneaded, and the obtained rubber composition was subjected to vulcanization and compression molding accompanied with heating into a prescribed shape, thereby preparing samples. As a control test, in Sample No. 7, a sample in which an additive was not used [100 parts by mass of NBR [containing a silica based additive (not an oil-containing particle) and a vulcanizer]] was prepared.

As physical properties of each of the samples, a coefficient of friction was examined in the following method.

1. Measuring unit:
Pin-on-disc tester (pin: SUJ2Φ5, tip R=5, disc: rubber sample), manufactured by Rhesca Corporation, friction player (to be rotated while applying a load to the pin and pressing it against the disc)
2. Measuring mode: One-way rotation (after 300 seconds)
3. Measuring temperature: 25° C.
4. Lubricant at the time of sliding:
  (1) Grease [trade name: MULTEMP SRL, manufactured by Kyodo Yushi Co., Ltd. (tackifier: lithium soap, base oil: ester oil)] was applied in a thickness of 5 mm on the disc, and after lapsing 24 hours, the grease was wiped off, followed by the measurement (a thin grease film was formed on the surface and penetrated into the rubber composition).
  (2) Grease [trade name: MULTEMP SRL, manufactured by Kyodo Yushi Co., Ltd. (tackifier: lithium soap, base oil: ester oil)] was applied in a thickness of 5 mm on the disc, and after lapsing 24 hours, the measurement was performed in a grease-applied state (when the disc was brought into contact with the pin and rotated, the grease was excluded into the surroundings of the contact part).
5. Contact pressure:
  (1) 0.2 MPa
  (2) 0.5 MPa
  (3) 1.0 MPa The measurement was performed by a lead-through method of applied load for measurement by the contact pressure. An applied load W was calculated according to the following equation (Hertz's contact equation).

$$W = (3/2)^2 \times (R/E)^2 \times \{\pi(P/S)\}^3$$

Here, $1/R = 1/R_1 + 1/R_2$; and $2/E = (1-v_1^2)/E_1 + (1-v_2^2)/E_2$.

In the foregoing respective equations, $R_1$ represents a radius (m) of the pin tip: $5.0 \times 10^{-3}$; $R_2$ represents a radius (m) of the rubber sheet contact part (in the vertical direction against the contact surface): ∞; $E_1$ represents an elastic modulus (Pa) of the pin: $2.06 \times 10^{11}$; $E_2$ represents an elastic modulus (Pa) of each rubber material (calculated in terms of a value of the base rubber material): 11.2 MPa; $v_1$ represents a Poisson's ratio of the pin: 0.28; $v_2$ represents a Poisson's ratio of each of rubber materials: 0.50; and P/S (Pa) represents an average contact pressure (contact pressure of the actual measurement).

Coefficients of friction by wiping off grease or applying grease at each contact pressure are shown in the following Tables 2 to 7 and FIGS. 2 to 7.

TABLE 2

Coefficient of friction by wiping off grease, contact pressure: 0.2 (MPa)

| | | Sliding speed (m/s) | | | | | | | |
|---|---|---|---|---|---|---|---|---|---|
| Sample No. | Additive No. | 0.00002 | 0.00004 | 0.00007 | 0.00010 | 0.00020 | 0.00030 | 0.00050 | 0.00070 |
| #1 | 1 | 0.0850 | 0.0820 | 0.0850 | 0.0850 | 0.0820 | 0.0840 | 0.1051 | 0.1210 |
| #2 | 2 | 0.0593 | 0.0860 | 0.0850 | 0.0803 | 0.1033 | 0.0820 | 0.1043 | 0.1360 |
| #3 | 3 | 0.0556 | 0.0815 | 0.0810 | 0.0857 | 0.1080 | 0.1270 | 0.1720 | 0.2170 |
| #4 | 4 | 0.0540 | 0.0547 | 0.0724 | 0.0967 | 0.1080 | 0.0927 | 0.0953 | 0.1450 |
| #5 | 5 | — | — | — | — | — | — | — | — |

TABLE 2-continued

Coefficient of friction by wiping off grease, contact pressure: 0.2 (MPa)

| | | | | | | | | | |
|---|---|---|---|---|---|---|---|---|---|
| #6 | 6 | 0.0560 | 0.0790 | 0.0760 | 0.0773 | 0.0880 | 0.0817 | 0.0797 | 0.1310 |
| #7 | No | 0.0721 | 0.0773 | — | 0.1287 | 0.2058 | 0.1723 | 0.1466 | — |

| Sample No. | Additive No. | Sliding speed (m/s) | | | | | | |
|---|---|---|---|---|---|---|---|---|
| | | 0.00100 | 0.00200 | 0.00300 | 0.00500 | 0.01000 | 0.02000 | 0.03000 |
| #1 | 1 | 0.1630 | 0.2160 | 0.3200 | 0.4700 | 1.0100 | — | — |
| #2 | 2 | 0.1810 | 0.4880 | 0.5620 | 0.8950 | 1.1160 | 1.3700 | — |
| #3 | 3 | 0.2890 | 0.5510 | 0.7600 | 0.9433 | 1.1867 | 1.3500 | — |
| #4 | 4 | 0.1583 | 0.2653 | 0.4400 | 0.5757 | 0.7840 | 1.1387 | — |
| #5 | 5 | — | — | — | — | — | — | — |
| #6 | 6 | 0.1193 | 0.3530 | 0.5540 | 0.8220 | 1.0907 | 1.1360 | — |
| #7 | No | 0.2960 | 0.4786 | 0.7762 | 0.8318 | 1.2023 | 1.3183 | 1.3804 |

TABLE 3

Coefficient of friction by wiping off grease, contact pressure: 0.5 (MPa)

| Sample No. | Additive No. | Sliding speed (m/s) | | | | | | | | |
|---|---|---|---|---|---|---|---|---|---|---|
| | | 0.00002 | 0.00004 | 0.00007 | 0.00010 | 0.00020 | 0.00030 | 0.00050 | 0.00070 | 0.00100 |
| #1 | 1 | 0.0357 | 0.0520 | 0.0617 | 0.0777 | 0.1349 | 0.1537 | 0.1893 | 0.2280 | 0.3353 |
| #2 | 2 | 0.0463 | 0.0687 | 0.0708 | 0.0820 | 0.1023 | 0.1202 | 0.1900 | 0.2197 | 0.2927 |
| #3 | 3 | 0.1100 | 0.2070 | 0.2463 | 0.2973 | 0.4197 | 0.4983 | 0.6080 | 0.6573 | 0.7120 |
| #4 | 4 | 0.0670 | 0.1023 | 0.1330 | 0.2003 | 0.2818 | 0.3548 | 0.4365 | 0.5370 | 0.6910 |
| #5 | 5 | 0.1445 | 0.1700 | 0.1950 | 0.2377 | 0.3467 | 0.3943 | 0.4490 | 0.5457 | 0.6863 |
| #6 | 6 | 0.0690 | 0.1288 | 0.1313 | 0.1857 | 0.2692 | 0.3203 | 0.3863 | 0.4450 | 0.5760 |
| #7 | No | 0.3760 | 0.4327 | 0.4169 | 0.5067 | 0.8318 | 0.9900 | 1.0000 | 1.1187 | 1.2147 |

| Sample No. | Additive No. | Sliding speed (m/s) | | | | | | | | |
|---|---|---|---|---|---|---|---|---|---|---|
| | | 0.00200 | 0.00300 | 0.00500 | 0.00700 | 0.01000 | 0.02000 | 0.03000 | 0.05000 | 0.07000 |
| #1 | 1 | 0.4898 | 0.6560 | 0.7700 | 1.0190 | 1.1367 | 1.2900 | — | — | — |
| #2 | 2 | 0.3800 | 0.4786 | 0.5754 | 0.6310 | 0.7413 | 0.9550 | 1.0920 | — | — |
| #3 | 3 | 0.9640 | 0.9420 | 1.0670 | 1.2100 | 1.2767 | 1.3433 | 1.5233 | — | — |
| #4 | 4 | 0.8040 | 1.0010 | 1.0253 | 1.0667 | 1.2900 | 1.4125 | 1.4650 | — | — |
| #5 | 5 | 0.8560 | 0.9393 | 1.1567 | 1.3267 | 1.3900 | 1.4200 | 1.4267 | — | — |
| #6 | 6 | 0.8210 | 0.9133 | 1.0400 | 1.3183 | 1.4791 | 1.7600 | 1.8000 | — | — |
| #7 | No | 1.3147 | 1.3803 | 1.4517 | 1.6193 | 1.6593 | 1.5760 | 1.8050 | 1.7878 | 1.7127 |

TABLE 4

Coefficient of friction by wiping off grease, contact pressure: 1.0 (MPa)

| Sample No. | Additive No. | Sliding speed (m/s) | | | | | | | | |
|---|---|---|---|---|---|---|---|---|---|---|
| | | 0.00002 | 0.00004 | 0.00007 | 0.00010 | 0.00020 | 0.00030 | 0.00050 | 0.00070 | 0.00100 |
| #1 | 1 | 0.0963 | 0.0970 | 0.1010 | 0.1297 | 0.1862 | 0.2250 | 0.2830 | 0.3420 | 0.4230 |
| #2 | 2 | 0.0630 | 0.0277 | 0.0663 | 0.0877 | 0.1202 | 0.1527 | 0.2000 | 0.2393 | 0.2840 |
| #3 | 3 | 0.1417 | 0.1747 | 0.1613 | 0.2257 | 0.3162 | 0.3743 | 0.4200 | 0.4420 | 0.4797 |
| #4 | 4 | 0.0997 | 0.1163 | 0.1433 | 0.1823 | 0.2443 | 0.2677 | 0.3337 | 0.3780 | 0.4457 |
| #5 | 5 | 0.1343 | 0.1920 | 0.1900 | 0.2707 | 0.3903 | 0.4610 | 0.6040 | 0.6787 | 0.7697 |
| #6 | 6 | 0.1240 | 0.1617 | 0.1923 | 0.2007 | 0.2643 | 0.3236 | 0.3683 | 0.4410 | 0.4737 |
| #7 | No | 0.2607 | 0.4083 | 0.3137 | 0.3803 | 0.5248 | 0.6423 | 0.7297 | 0.8143 | 0.9427 |

| Sample No. | Additive No. | Sliding speed (m/s) | | | | | | | | |
|---|---|---|---|---|---|---|---|---|---|---|
| | | 0.00200 | 0.00300 | 0.00500 | 0.00700 | 0.01000 | 0.02000 | 0.03000 | 0.05000 | 0.07000 |
| #1 | 1 | 0.6165 | 0.7865 | 0.9880 | 1.0750 | 1.1938 | 1.3150 | 1.3400 | — | — |
| #2 | 2 | 0.3715 | 0.4571 | 0.5370 | 0.6026 | 0.7079 | 0.7413 | 0.8128 | 0.8600 | — |
| #3 | 3 | 0.6753 | 0.8390 | 1.0667 | 1.2367 | 1.2308 | 1.2633 | 1.2950 | — | — |
| #4 | 4 | 0.6453 | 0.7683 | 1.0900 | 1.1600 | 1.2008 | 1.2900 | 1.2600 | — | — |
| #5 | 5 | 0.9497 | 1.0167 | 1.1167 | 1.1700 | 1.1067 | 1.1133 | 1.0700 | — | — |
| #6 | 6 | 0.6166 | 0.8230 | 1.0043 | 1.2967 | 1.4300 | 1.4467 | 1.4650 | — | — |
| #7 | No | 1.1167 | 1.1400 | 1.2400 | 1.2433 | 1.2733 | 1.2833 | 1.3500 | — | — |

TABLE 5

Coefficient of friction by applying grease, contact pressure: 0.2 (MPa)

| Sample No. | Additive No. | Sliding speed (m/s) | | | | | | |
|---|---|---|---|---|---|---|---|---|
| | | 0.00002 | 0.00004 | 0.00007 | 0.00010 | 0.00020 | 0.00030 | 0.00050 |
| #1 | 1 | 0.0385 | 0.0380 | 0.0420 | 0.0537 | 0.0700 | 0.0776 | 0.0912 |
| #2 | 2 | 0.0275 | 0.0410 | 0.0331 | 0.0347 | 0.0400 | 0.0468 | 0.0562 |
| #3 | 3 | | | | | | | |
| #4 | 4 | | | | | | | |
| #5 | 5 | | | | | | | |
| #6 | 6 | | | | | | | |
| #7 | No | 0.1983 | 0.1850 | 0.1288 | 0.1259 | 0.1479 | 0.1698 | 0.1950 |

| Sample No. | Additive No. | Sliding speed (m/s) | | | | | | |
|---|---|---|---|---|---|---|---|---|
| | | 0.00070 | 0.00100 | 0.00200 | 0.00300 | 0.00500 | 0.00700 | 0.01000 |
| #1 | 1 | 0.1096 | 0.1320 | 0.1660 | 0.1862 | 0.2344 | 0.2570 | 0.3490 |
| #2 | 2 | 0.0660 | 0.0759 | 0.0950 | 0.1120 | 0.1270 | 0.1553 | 0.1767 |
| #3 | 3 | | | | | | | |
| #4 | 4 | | | | | | | |
| #5 | 5 | | | | | | | |
| #6 | 6 | | | | | | | |
| #7 | No | 0.2344 | 0.2754 | 0.3510 | 0.3990 | 0.4940 | 0.5340 | 0.6270 |

TABLE 6

Coefficient of friction by applying grease, contact pressure: 0.5 (MPa)

| Sample No. | Additive No. | Sliding speed (m/s) | | | | | | | | |
|---|---|---|---|---|---|---|---|---|---|---|
| | | 0.00002 | 0.00004 | 0.00007 | 0.00010 | 0.00020 | 0.00030 | 0.00050 | 0.00070 | 0.00100 |
| #1 | 1 | 0.0255 | 0.0440 | 0.0510 | 0.0525 | 0.0480 | 0.0407 | 0.0300 | 0.0330 | 0.0389 |
| #2 | 2 | 0.0213 | 0.0503 | 0.0603 | 0.0661 | 0.0630 | 0.0520 | 0.0440 | 0.0380 | 0.0302 |
| #3 | 3 | | | | | | | | | |
| #4 | 4 | | | | | | | | | |
| #5 | 5 | | | | | | | | | |
| #6 | 6 | | | | | | | | | |
| #7 | No | 0.0413 | 0.0643 | 0.0683 | 0.0776 | 0.0847 | 0.0813 | 0.0853 | 0.0747 | 0.0741 |

| Sample No. | Additive No. | Sliding speed (m/s) | | | | | | | | |
|---|---|---|---|---|---|---|---|---|---|---|
| | | 0.00200 | 0.00300 | 0.00500 | 0.00700 | 0.01000 | 0.02000 | 0.03000 | 0.05000 | 0.07000 |
| #1 | 1 | 0.0450 | 0.0562 | 0.0724 | 0.0851 | 0.1017 | 0.1318 | 0.1530 | 0.1760 | |
| #2 | 2 | 0.0340 | 0.0389 | 0.0457 | 0.0550 | 0.0692 | 0.0970 | 0.1097 | 0.1335 | |
| #3 | 3 | | | | | | | | | |
| #4 | 4 | | | | | | | | | |
| #5 | 5 | | | | | | | | | |
| #6 | 6 | | | | | | | | | |
| #7 | No | 0.0923 | 0.1047 | 0.1148 | 0.1380 | 0.1622 | 0.1987 | 0.2317 | 0.2327 | 0.2267 |

TABLE 7

Coefficient of friction by applying grease, contact pressure: 1.0 (MPa)

| Sample No. | Additive No. | Sliding speed (m/s) | | | | | | | | |
|---|---|---|---|---|---|---|---|---|---|---|
| | | 0.00002 | 0.00004 | 0.00007 | 0.00010 | 0.00020 | 0.00030 | 0.00050 | 0.00070 | 0.00100 |
| #1 | 1 | 0.0245 | 0.0295 | 0.0288 | 0.0275 | 0.0210 | 0.0195 | 0.0257 | 0.0310 | 0.0355 |
| #2 | 2 | 0.0295 | 0.0337 | 0.0347 | 0.0340 | 0.0250 | 0.0166 | 0.0163 | 0.0180 | 0.0213 |
| #3 | 3 | | | | | | | | | |
| #4 | 4 | | | | | | | | | |
| #5 | 5 | | | | | | | | | |

TABLE 7-continued

| | | Coefficient of friction by applying grease, contact pressure: 1.0 (MPa) | | | | | | | | |
|---|---|---|---|---|---|---|---|---|---|---|
| #6 | 6 | | | | | | | | | |
| #7 | No | 0.0417 | 0.0610 | 0.0630 | 0.0450 | 0.0417 | 0.0389 | 0.0457 | 0.0525 | 0.0603 |

| Sample | Additive | Sliding speed (m/s) | | | | | | | | |
|---|---|---|---|---|---|---|---|---|---|---|
| No. | No. | 0.00200 | 0.00300 | 0.00500 | 0.00700 | 0.01000 | 0.02000 | 0.03000 | 0.05000 | 0.07000 |
| #1 | 1 | 0.0450 | 0.0562 | 0.0759 | 0.0871 | 0.1175 | 0.1585 | 0.1905 | 0.2455 | 0.2630 |
| #2 | 2 | 0.0280 | 0.0343 | 0.0397 | 0.0479 | 0.0631 | 0.0867 | 0.1175 | 0.1514 | 0.1738 |
| #3 | 3 | | | | | | | | | |
| #4 | 4 | | | | | | | | | |
| #5 | 5 | | | | | | | | | |
| #6 | 6 | | | | | | | | | |
| #7 | No | 0.0850 | 0.0960 | 0.1148 | 0.1350 | 0.1585 | 0.2138 | 0.2340 | 0.2870 | 0.2960 |

It is understood from the foregoing results that among the organic acid amides, the unsaturated fatty acid monoamides are preferable, and oleic acid monoamide is more preferable in each of the sliding speeds. Also, it is understood that among the metal soaps, lithium stearate is preferable.

Example 2

NBR [containing carbon black and graphite] was used as a rubber component; lithium stearate [product number: S-7000, manufactured by Sakai Chemical Industry Co., Ltd.] was used as a metal soap; purified oleic acid amide [trade name: DIAMID O-200, manufactured by Nippon Kasei Chemical Co., Ltd.] was used as an organic acid amide; and dimethylsilicone-supported (dimethylpolysiloxane-supported) silica (silicone compound) [trade name: TORAYFIL F-202, manufactured by Dow Corning Toray Co., Ltd. (oil content: 50 to 65% by mass, oil kinematic viscosity: about 60,000 cs, particle size: 10 to 100 μm)] was used as an oil-containing particle.

The rubber component, the metal soap, the organic acid amide and the oil-containing particle were kneaded, respectively in amounts shown in Table 8, and the obtained rubber composition was subjected to vulcanization and compression molding accompanied with heating into a prescribed shape, thereby preparing samples. As physical properties of each of the samples, a coefficient of friction was examined according to the following method. The results are also shown in Table 8.

1. Measuring unit: Ring-on-disc tester
2. Sliding speed: 0.1 m/s
3. Ring: Rubber sample, inside diameter: 20 mm, outside diameter: 23 mm
4. Disc: Stainless steel-made
5. Grease: [trade name: RAREMAX AF-1, manufactured by Kyodo Yushi Co., Ltd. (tackifier: urea compound, base oil: mineral oil)
6. Contact pressure: 1 MPa
7. Measuring temperature: 25° C., natural temperature rise The grease was applied in a thickness of 5 mm on the disc, and after lapsing 24 hours, the measurement was performed. At the time of measurement, when the ring was brought into contact with the disc and rotated, the grease was excluded into the surroundings of the contact part.

TABLE 8

| | Composition of rubber composition (% by mass) | | | | |
|---|---|---|---|---|---|
| Sample No. | Metal soap | Organic acid amide | Oil-containing resin | Rubber component | Coefficient of friction |
| #11 | 0 | 0 | 0 | Balance | 0.80 |
| #12 | 0.1 | 0.0 | 0.0 | Balance | 0.73 |
| #13 | 0.2 | 0.0 | 0.0 | Balance | 0.72 |
| #14 | 0.5 | 0.0 | 0.0 | Balance | 0.73 |
| #15 | 1.0 | 0.0 | 0.0 | Balance | 0.72 |
| #16 | 2.0 | 0.0 | 0.0 | Balance | 0.71 |
| #17 | 4.0 | 0.0 | 0.0 | Balance | 0.72 |
| #18 | 0.0 | 0.1 | 0.0 | Balance | 0.79 |
| #19 | 0.0 | 0.2 | 0.0 | Balance | 0.78 |
| #20 | 0.0 | 0.5 | 0.0 | Balance | 0.78 |
| #21 | 0.0 | 1.0 | 0.0 | Balance | 0.71 |
| #22 | 0.0 | 2.0 | 0.0 | Balance | 0.72 |
| #23 | 0.0 | 4.0 | 0.0 | Balance | 0.71 |
| #24 | 0.1 | 0.1 | 0.0 | Balance | 0.75 |
| #25 | 0.1 | 0.2 | 0.0 | Balance | 0.72 |
| #26 | 0.1 | 0.5 | 0.0 | Balance | 0.69 |
| #27 | 0.1 | 1.0 | 0.0 | Balance | 0.64 |
| #28 | 0.1 | 2.0 | 0.0 | Balance | 0.63 |
| #29 | 0.1 | 4.0 | 0.0 | Balance | 0.63 |
| #30 | 0.0 | 0.0 | 0.1 | Balance | 0.79 |
| #31 | 0.0 | 0.0 | 0.2 | Balance | 0.78 |
| #32 | 0.0 | 0.0 | 0.5 | Balance | 0.78 |
| #33 | 0.0 | 0.0 | 1.0 | Balance | 0.77 |
| #34 | 0.0 | 0.0 | 2.0 | Balance | 0.72 |
| #35 | 0.0 | 0.0 | 4.0 | Balance | 0.72 |

TABLE 8-continued

| Sample No. | Composition of rubber composition (% by mass) | | | | Coefficient of friction |
|---|---|---|---|---|---|
| | Metal soap | Organic acid amide | Oil-containing resin | Rubber component | |
| #36 | 0.1 | 0.0 | 0.1 | Balance | 0.71 |
| #37 | 0.1 | 0.0 | 0.2 | Balance | 0.70 |
| #38 | 0.1 | 0.0 | 0.5 | Balance | 0.69 |
| #39 | 0.1 | 0.0 | 1.0 | Balance | 0.65 |
| #40 | 0.1 | 0.0 | 2.0 | Balance | 0.63 |
| #41 | 0.1 | 0.0 | 4.0 | Balance | 0.63 |
| #42 | 0.0 | 1.0 | 0.1 | Balance | 0.78 |
| #43 | 0.0 | 1.0 | 0.2 | Balance | 0.76 |
| #44 | 0.0 | 1.0 | 0.5 | Balance | 0.72 |
| #45 | 0.0 | 1.0 | 1.0 | Balance | 0.68 |
| #46 | 0.0 | 1.0 | 2.0 | Balance | 0.68 |
| #47 | 0.0 | 1.0 | 4.0 | Balance | 0.67 |
| #48 | 0.1 | 1.0 | 0.1 | Balance | 0.67 |
| #49 | 0.1 | 1.0 | 0.2 | Balance | 0.64 |
| #50 | 0.1 | 1.0 | 0.5 | Balance | 0.60 |
| #51 | 0.1 | 1.0 | 1.0 | Balance | 0.52 |
| #52 | 0.1 | 1.0 | 2.0 | Balance | 0.40 |
| #53 | 0.1 | 1.0 | 4.0 | Balance | 0.39 |

The following are understood through an analysis of the results shown in Table 8.

(1) A change of the coefficient of friction with the content of the metal soap can be grasped from the results of Samples Nos. 11 to 17. That change is shown in FIG. 8.

Figure 8:
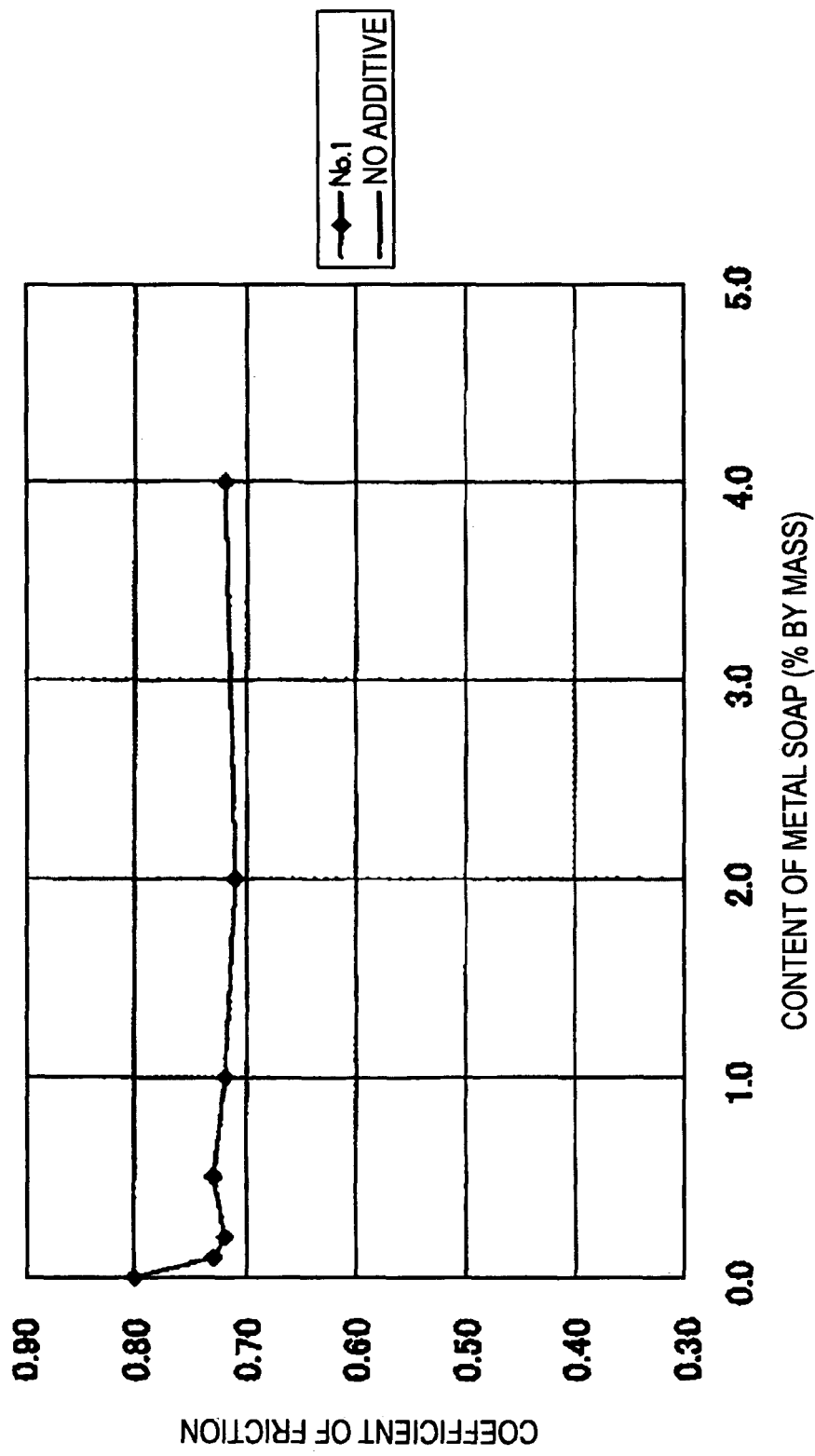
FIG. 8 is a graph showing a change of coefficient of friction with the content of a metal soap of a sample made of a rubber composition obtained in Example 2.

As shown in FIG. 8, it is understood that when the metal soap is not contained in the rubber composition, the coefficient of friction is 0.80. On the other hand, it is understood that in the case of containing the metal soap in the rubber composition (a line of No. 1 in FIG. 8), the coefficient of friction is lowered to about 0.72.

(2) A change of the coefficient of friction with the content of the organic acid amide can be grasped from the results of Samples Nos. 11 and 18 to 23. That change is shown in FIG. 9.

Figure 9:
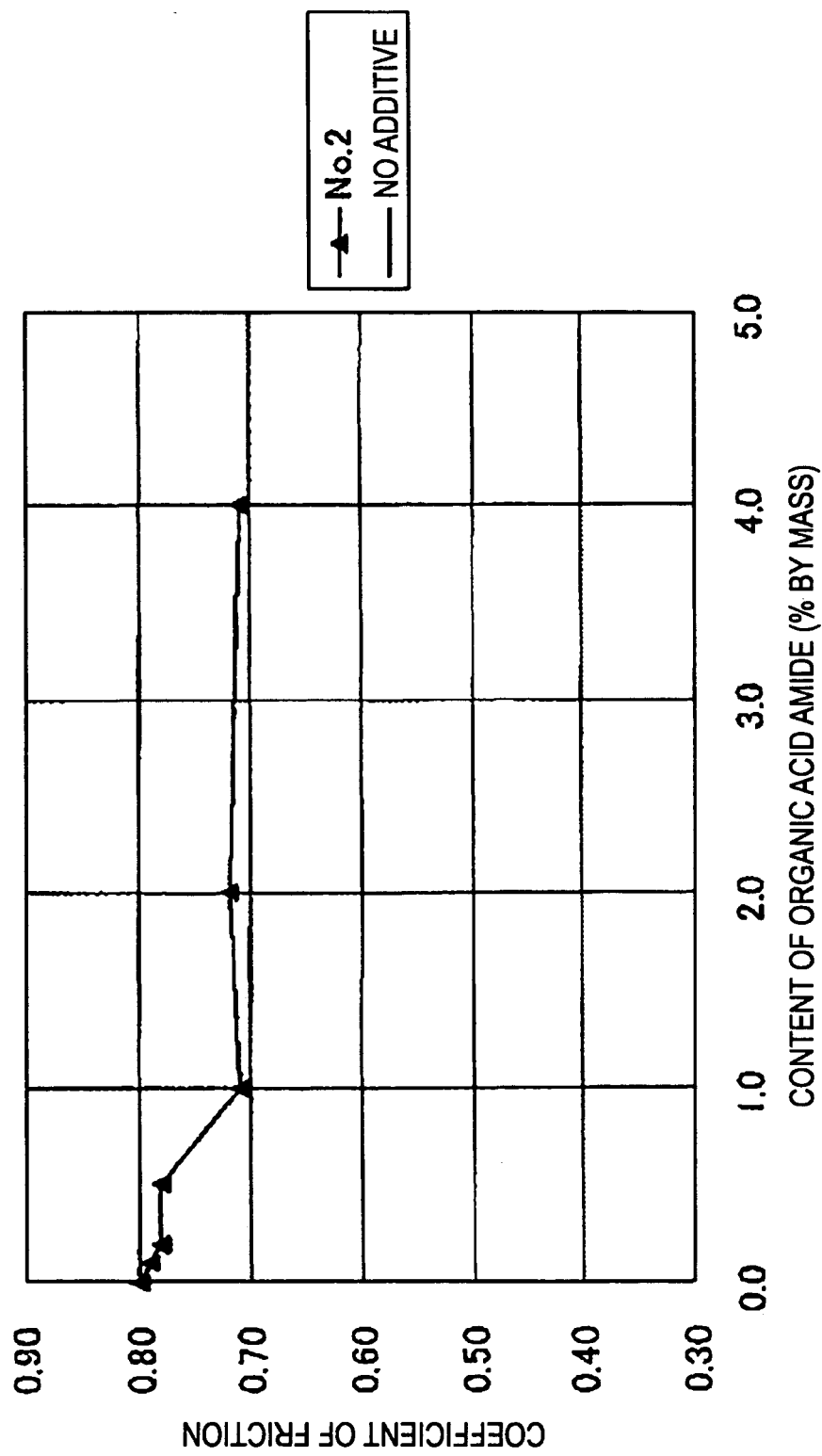
FIG. 9 is a graph showing a change of coefficient of friction with the content of an organic acid amide of a sample made of a rubber composition obtained in Example 2.

As shown in FIG. 9, it is understood that when the organic acid amide is not contained in the rubber composition, the coefficient of friction is 0.80. On the other hand, it is understood that in the case of containing the organic acid amide in the rubber composition (a line of No. 2 in FIG. 9), the coefficient of friction is lowered to about 0.72.

(3) A change of the coefficient of friction when the metal soap and the organic acid amide are used jointly, and the content of the organic acid amide is varied while making the content of the metal soap constant at 0.1% by mass can be grasped from the results of Samples Nos. 12 and 24 to 29. That change is shown in FIG. 10.

Figure 10:
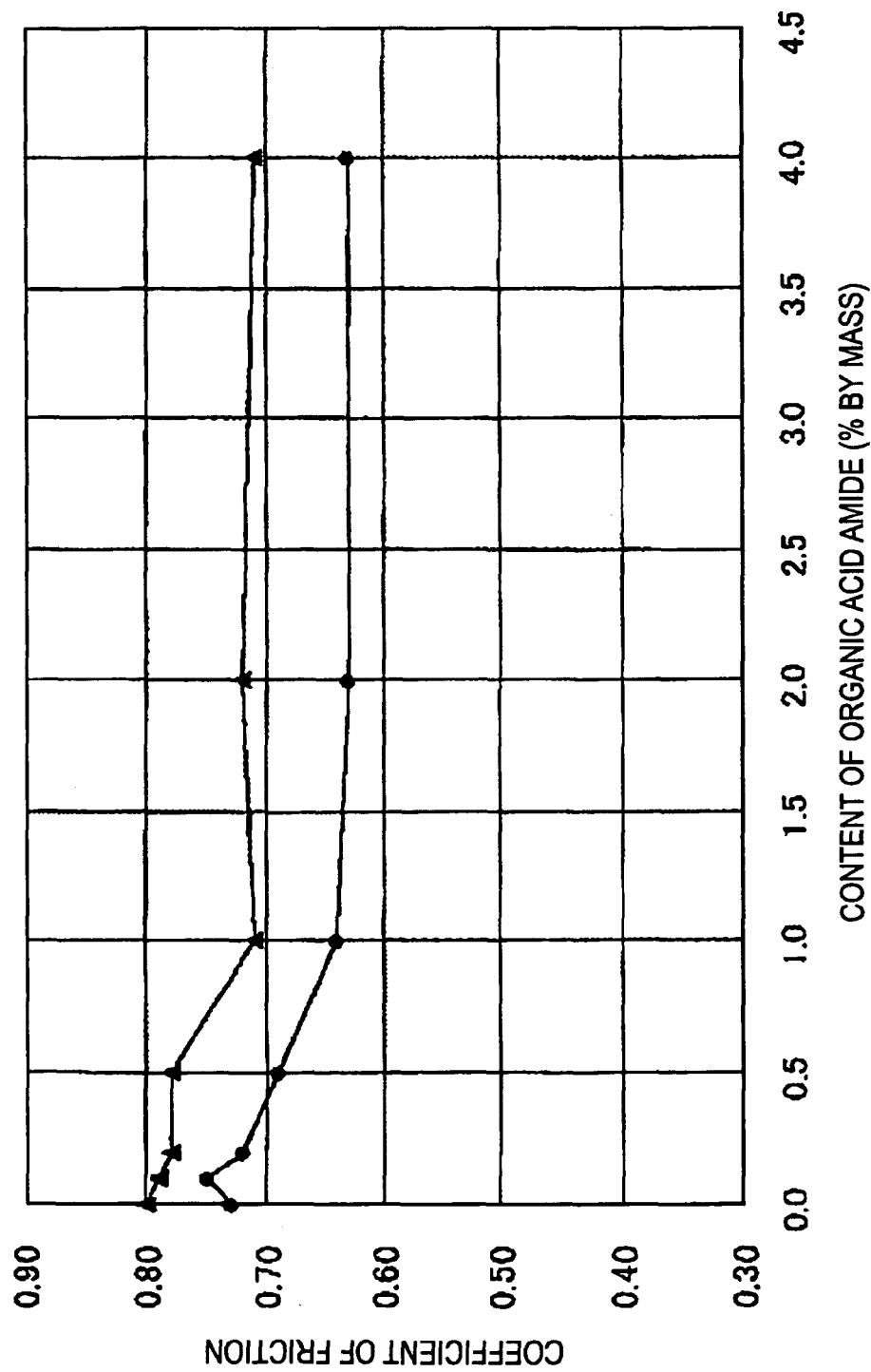
FIG. 10 is a graph showing a change of coefficient of friction with the content of an organic acid amide when a metal soap and an organic acid amide are used jointly in a sample made of a rubber composition obtained in Example 2.

As shown in FIG. 10, it is understood that in the case of using the organic acid amide alone (black triangle marks in FIG. 10), the coefficient of friction is lowered to about 0.72, whereas in the case of further containing the metal soap, thereby using the metal soap and the organic acid amide jointly (black circle marks in FIG. 10), the coefficient of friction can be reduced to about 0.63.

(4) A change of the coefficient of friction with the content of the oil-containing particle can be grasped from the results of Samples Nos. 11 and 30 to 35. That change is shown in FIG. 11.

Figure 11:
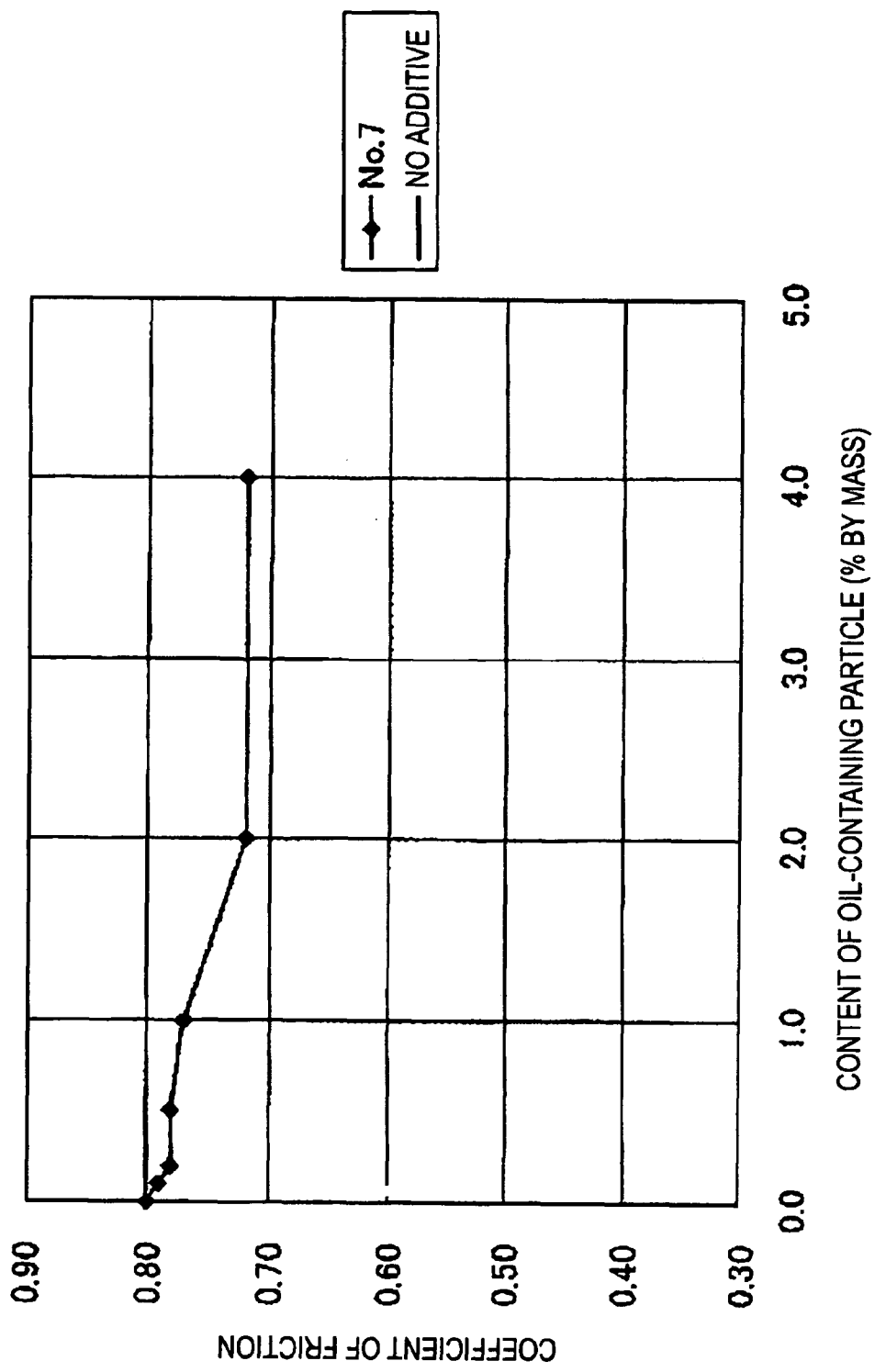
FIG. 11 is a graph showing a change of coefficient of friction with the content of an oil-containing particle of a sample made of a rubber composition obtained in Example 2.

As shown in FIG. 11, it is understood that when the oil-containing particle is not contained in the rubber composition, the coefficient of friction is 0.80. On the other hand, it is understood that in the case of containing the oil-containing particle in the rubber composition (a line of No. 7 in FIG. 11), the coefficient of friction is lowered to about 0.72.

(5) A change of the coefficient of friction when the metal soap and the oil-containing particle are used jointly, and the content of the oil-containing particle is varied while making the content of the metal soap constant at 0.1% by mass can be grasped from the results of Samples Nos. 12 and 36 to 41. That change is shown in FIG. 12.

Figure 12:
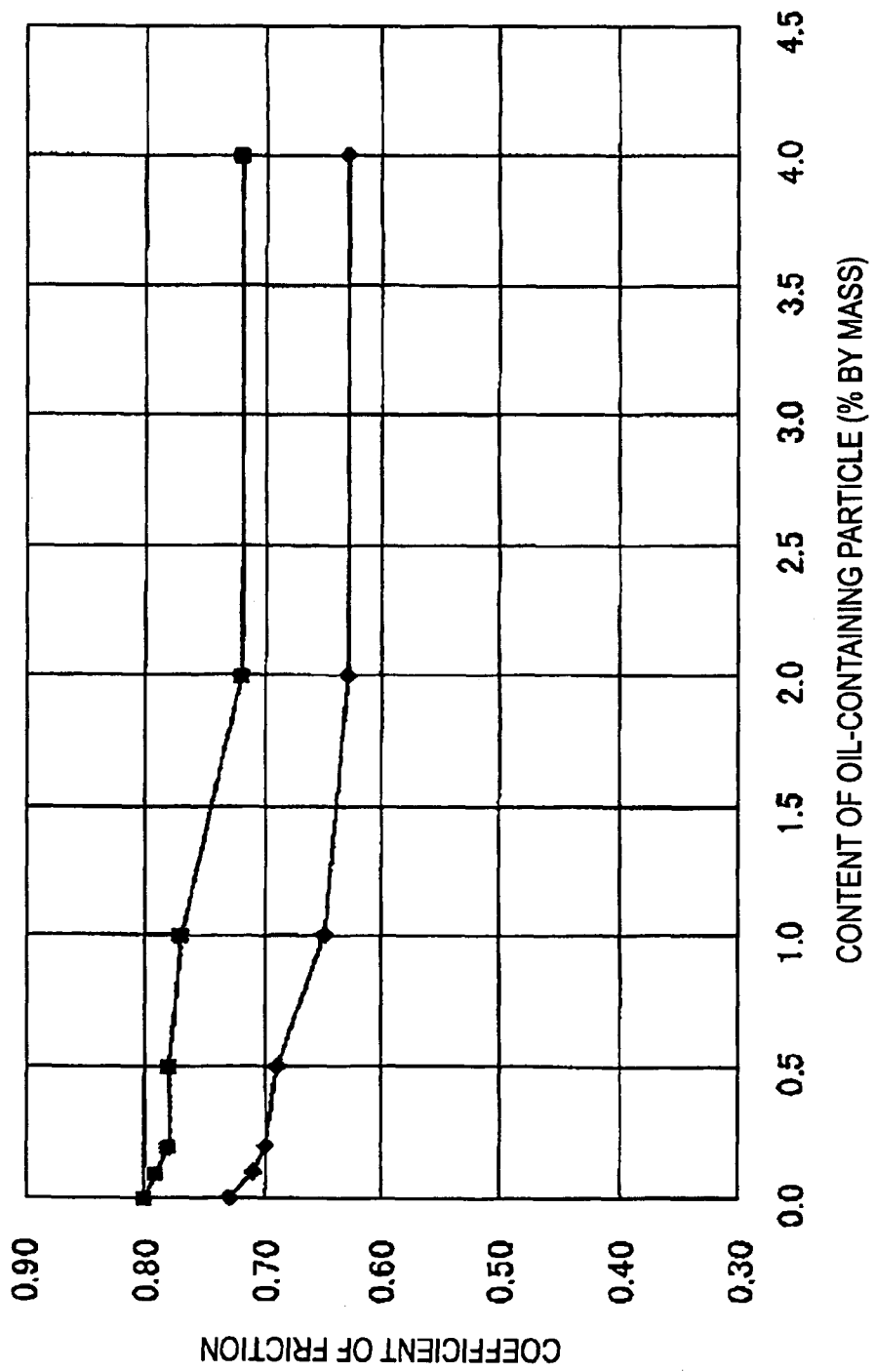
FIG. 12 is a graph showing a change of coefficient of friction with the content of an oil-containing particle when a metal soap and an oil-containing particle are used jointly in a sample made of a rubber composition obtained in Example 2.

As shown in FIG. 12, it is understood that in the case of using the oil-containing particle alone (black square marks in FIG. 12), the coefficient of friction is lowered to about 0.72, whereas in the case of further containing the metal soap, thereby using the metal soap and the oil-containing particle jointly (black rectangle marks in FIG. 12), the coefficient of friction can be reduced to about 0.63.

(6) A change of the coefficient of friction when the organic acid amide and the oil-containing particle are used jointly, and the content of the oil-containing particle is varied while making the content of the organic acid amide constant at 1.0% by mass can be grasped from the results of Samples Nos. 21 and 42 to 47. That change is shown in FIG. 13.

Figure 13:
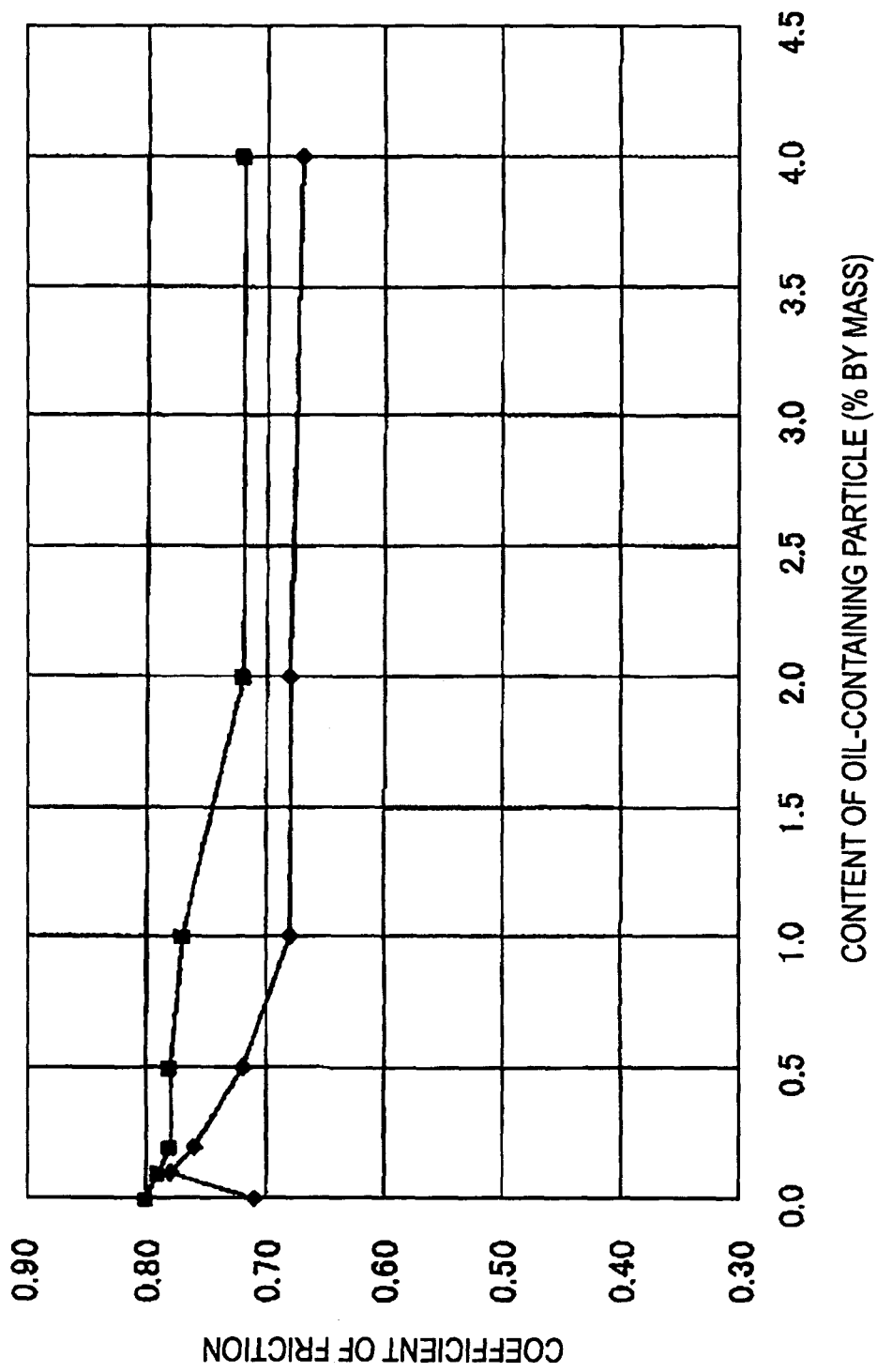
FIG. 13 is a graph showing a change of coefficient of friction with the content of an oil-containing particle when an organic acid amide and an oil-containing particle are used jointly in a sample made of a rubber composition obtained in Example 2.

As shown in FIG. 13, it is understood that in the case of using the organic acid amide alone (black square marks in FIG. 13), the coefficient of friction is lowered to about 0.72, whereas in the case of further containing the oil-containing particle, thereby using the organic acid amide and the oil-containing particle jointly (black rectangle marks in FIG. 13), the coefficient of friction can be reduced to about 0.67.

(7) A change of the coefficient of friction when the metal soap, the organic acid amide and the oil-containing particle are used jointly, and the content of the oil-containing particle is varied while making the content of the metal soap constant at 0.1% by mass and also making the content of the organic acid amide constant at 1.0% by mass can be grasped from the results of Samples Nos. 27 and 48 to 53. That change is shown in FIG. 14.

Figure 14:
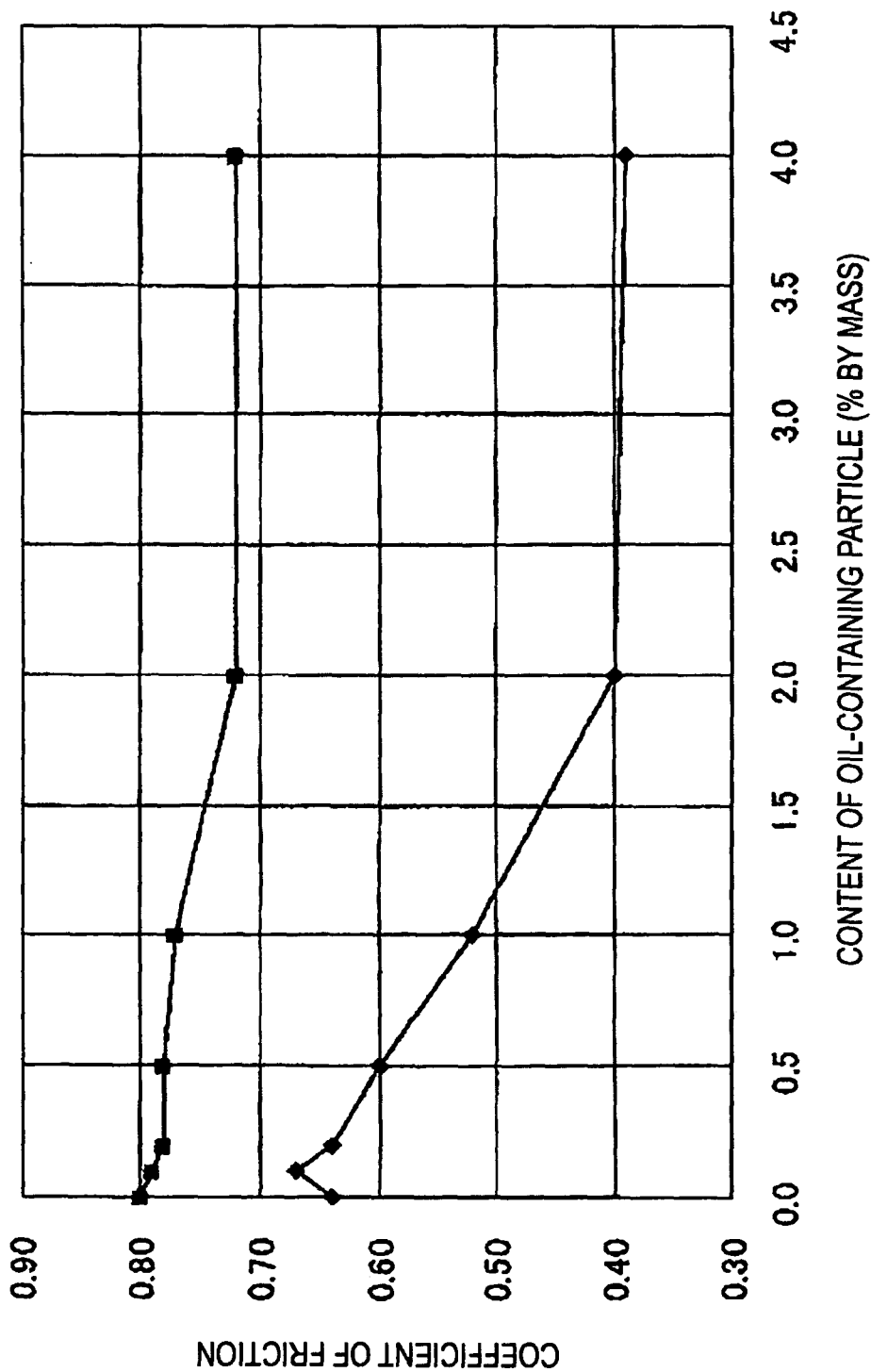
FIG. 14 is a graph showing a change of coefficient of friction with the content of an oil-containing particle when a metal soap, an organic acid amide and an oil-containing particle are used jointly in a sample made of a rubber composition obtained in Example 2.

As shown in FIG. 14, it is understood that in the case of using the oil-containing particle alone (black square marks in FIG. 14), the coefficient of friction is lowered to about 0.72, whereas in the case of further containing the metal soap and the organic acid amide, thereby using the metal soap, the organic acid amide and the oil-containing particle jointly (black rectangle marks in FIG. 14), the coefficient of friction can be remarkably reduced to not more than about 0.40.

The following are understood from the foregoing results.

In the case where any of the metal soap, the organic acid amide or the oil-containing particle is not contained in the rubber composition, the coefficient of friction of the sample is 0.80.

On the other hand, it is understood that in the case of containing the metal soap in the rubber composition (coefficient of friction: about 0.72), the coefficient of friction of the sample can be reduced by about 0.08; in the case of containing the organic acid amide in the rubber composition (coefficient of friction: about 0.72), the coefficient of friction of the sample can be reduced by about 0.08; and in the case of containing the oil-containing particle in the rubber composition (coefficient of friction: about 0.72), the coefficient of friction of the sample can be reduced by about 0.08.

In view of these facts, it is expected that in the case of using the metal soap, the organic acid amide and the oil-containing particle jointly, the coefficient of friction can be reduced by about 0.24 as compared with that in the case of not containing any of the metal soap, the organic acid amide or the oil-containing particle in the rubber composition.

On the other hand, in fact, in the case of using the metal soap, the organic acid amide and the oil-containing particle jointly, contrary to predictions, the coefficient of friction becomes about 0.40, and therefore, it is understood that the coefficient of friction can be greatly reduced by 0.40 as compared with that in the case of not containing any of the metal soap, the organic acid amide or the oil-containing particle in the rubber composition.

As is evident from this fact, in the invention, three components including the metal soap, the organic acid amide and the oil-containing particle are used jointly, and therefore, it is understood that contrary to predictions, the coefficient of friction can be remarkably reduced due to a synergistic effect to be brought by the joint use of these components.

In the light of the above, the sealing device of the invention is constituted of a rubber composition in which three components including the metal soap, the organic acid amide and the oil-containing particle are used jointly, and the coefficient of friction can be remarkably reduced, and therefore, it is able to be suitably used for, for example, a wheel bearing which is used for supporting an automobile wheel, and the like.

Experimental Example

As the Experimental Example, 96.9 parts by mass of NBR [containing carbon black and graphite] as a rubber component, 0.1 parts by mass of lithium stearate [product number: S-7000, manufactured by Sakai Chemical Industry Co., Ltd.] as a metal soap;, 1.0 part by mass of purified oleic acid amide [trade name: DIAMID O-200, manufactured by Nippon Kasei Chemical Co., Ltd.] as an organic acid amide and 2.0 parts by mass of dimethylsilicone-supported (dimethylpolysiloxane-supported) silica (silicone compound) [trade name: TORAYFIL F-202, manufactured by Dow Corning Toray Co., Ltd. (oil content: 50 to 65% by mass, oil kinematic viscosity: about 60,000 cs, particle size: 10 to 100 μm)] as an oil-containing particle were kneaded to obtain a rubber composition which is corresponding to the rubber composition of Sample No. #52 of Example 2.

By using the thus obtained rubber composition, the elastic member (seal member) 3 having the shape shown in FIG. 1 was formed together with the first member 1 shown in FIG. 1 by means of vulcanization and compression molding accompanied with heating, and the elastic member (seal member) 3 having been formed and fixed to the first member 1 was fitted with the second member 2, thereby preparing a sealing device.

Also, for comparison, NBR [containing carbon black and graphite] which is a current rubber corresponding to the rubber composition of Sample No. #11 of Example 2 was used. By using the foregoing NBR, the elastic member (seal member) 3 having the shape shown in FIG. 1 was formed together with the first member 1 shown in FIG. 1 by means of vulcanization and compression molding accompanied with heating, and the elastic member (seal member) 3 having been formed and fixed to the first member 1 was fitted with the second member 2, thereby preparing a sealing device.

By using each of these sealing devices, grease [trade name: RAREMAX AF-1, manufactured by Kyodo Yushi Co., Ltd. (tackifier: urea compound, base oil: mineral oil)] was enclosed between the first axial seal lip 31 and the second axial seal lip 32 such that each of the lips was brought into sliding contact with the inside surface of the outside ring part 22; the second member 2 was relatively rotated against the first member 1 at a plural number of prescribed rotational speeds ($mm^{-1}$) in a state where an axial interference in the use state of the sealing device was 0.6 mm (a state where the tip edge 34 of the first axial seal lip 31 and the tip edge 35 of the second axial lip 32 were moved from the state of contacting with the inside surface of the outside ring part 22 so as to make a clearance in the axial direction between the inside ring part 12 and the outside ring part 22 close by 0.6 mm); and at that time, a rotational torque (mN·m) was measured. The results are shown in Table 9 and FIG. 15.

TABLE 9

| Rotational speed ($min^{-1}$) | Current rubber | Rubber composition of Sample No. 52 of Example 2 |
|---|---|---|
| 100 | 117 | 88 |
| 300 | 143 | 108 |
| 500 | 150 | 116 |
| 700 | 148 | 116 |
| 1000 | 143 | 114 |
| 1200 | 138 | 112 |
| 2000 | 128 | 106 |

Figure 15:
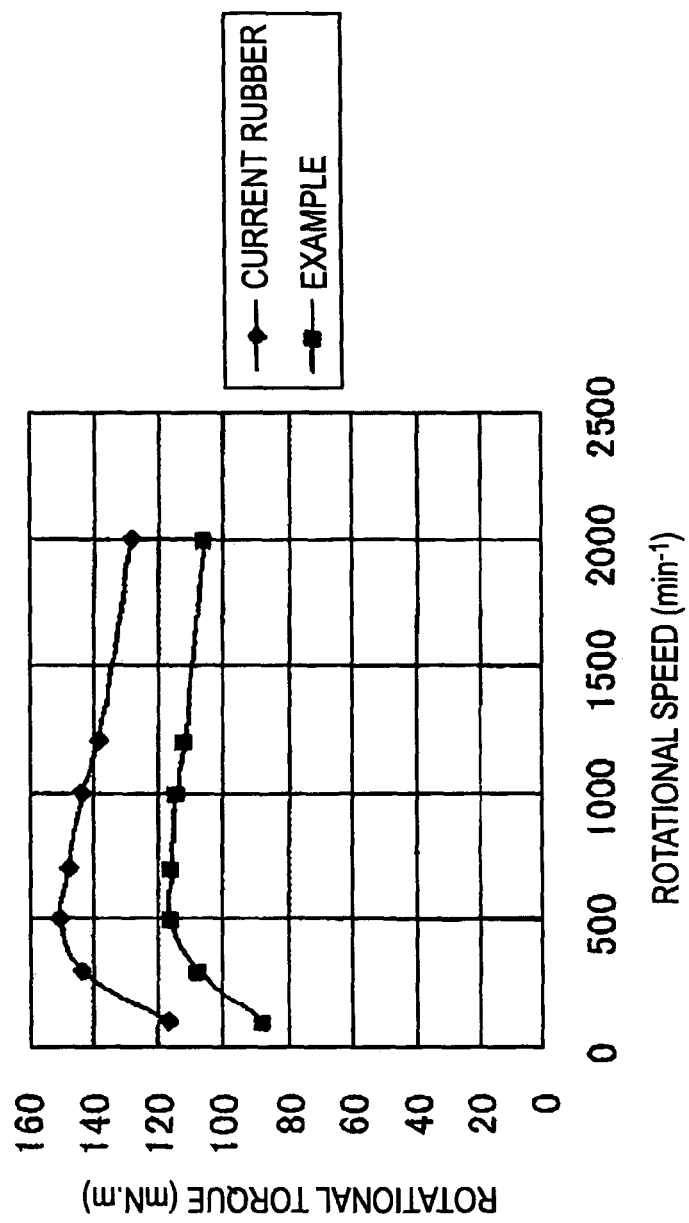
FIG. 15 is a graph showing a relationship between a rotational speed and a rotational torque of a sealing device in the Experimental Example.

From the results shown in Table 9 and FIG. 15, it is understood that in the case of using the rubber composition of Sample No. 52 of Example 2, the rotational torque of the sealing device can be remarkably reduced as compared with that of the current rubber.

Industrial Applicability

According to the invention, it is able to provide a sealing device in which adhesion of an elastic member used for the sealing device is controlled, and a coefficient of friction against a member sliding against the sealing device is reduced.

[FIG. 2]

BY WIPING OFF GREASE, CONTACT PRESSURE: 0.2 MPa

Coefficient of Friction

SLIDING SPEED (m/s)

[FIG. 3]

BY WIPING OFF GREASE, CONTACT PRESSURE: 0.5 (MPa)

COEFFICIENT OF FRICTION

SLIDING SPEED (m/s)

Figure 4:
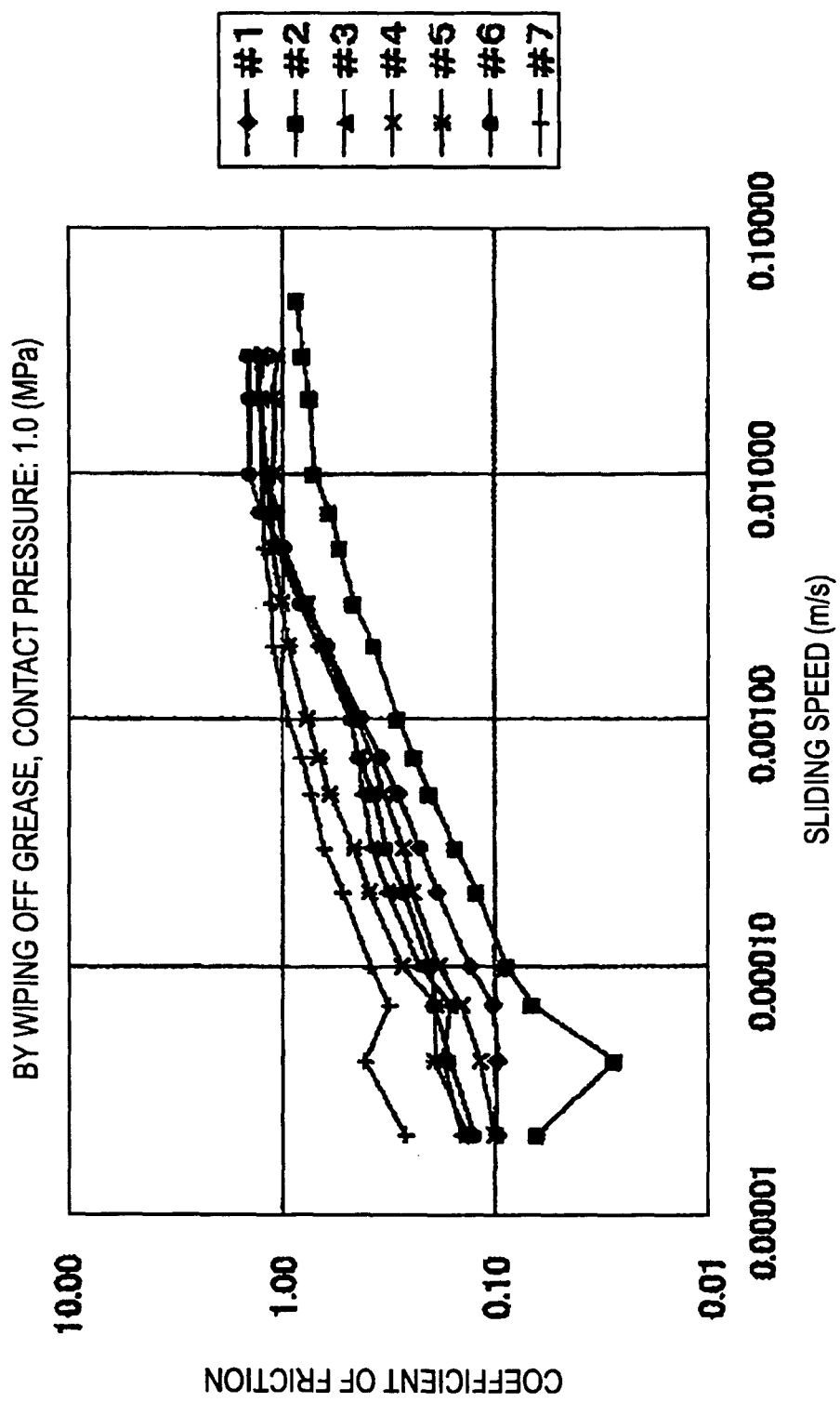
FIG. 4 is a graph showing a relationship between a sliding speed and a coefficient of friction when a contact pressure of a sample made of a rubber composition obtained in Example 1 is 1.0 MPa, and grease is wiped off.
Figure 5:
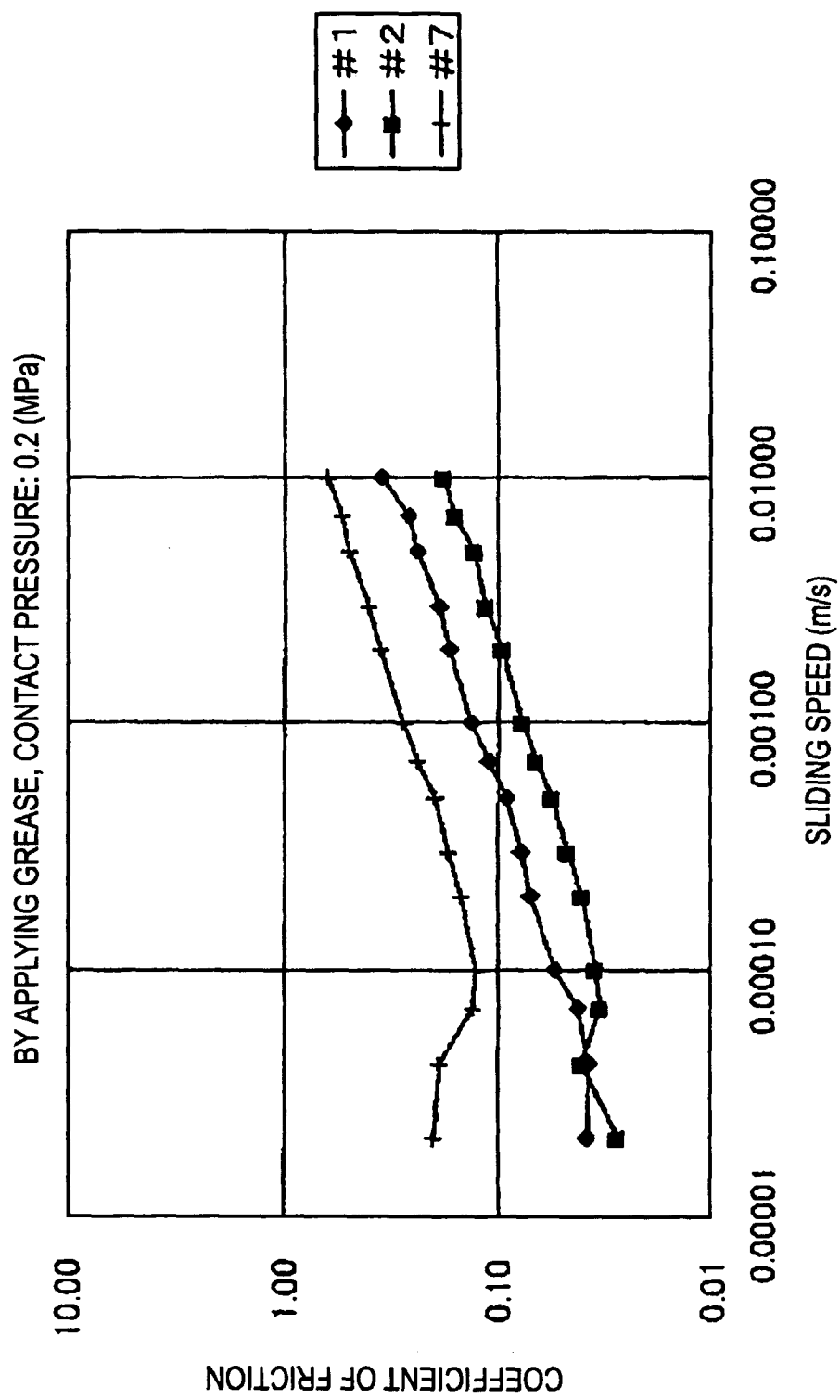
FIG. 5 is a graph showing a relationship between a sliding speed and a coefficient of friction when a contact pressure of a sample made of a rubber composition obtained in Example 1 is 0.2 MPa, and grease is applied.
Figure 6:
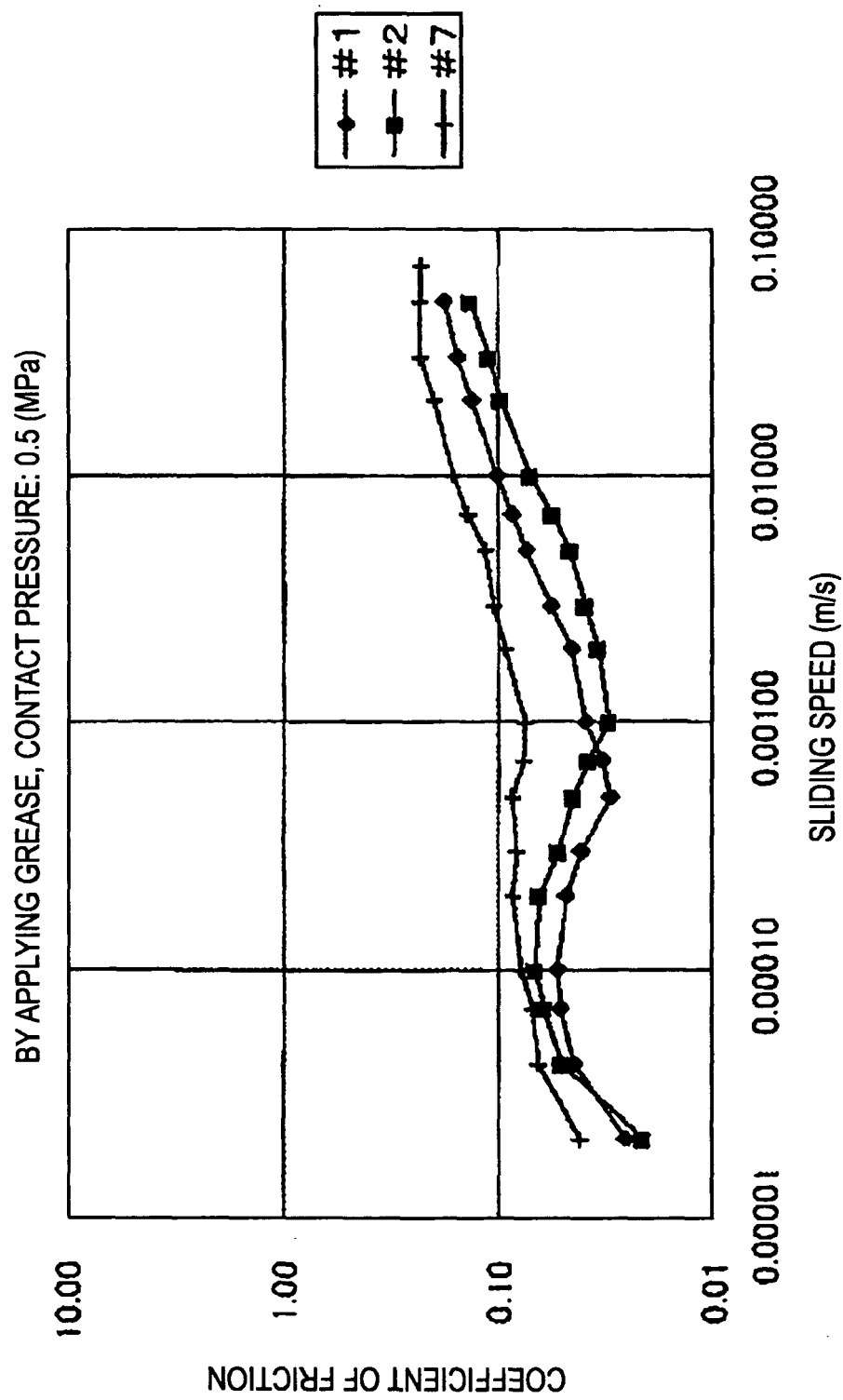
FIG. 6 is a graph showing a relationship between a sliding speed and a coefficient of friction when a contact pressure of a sample made of a rubber composition obtained in Example 1 is 0.5 MPa, and grease is applied.
Figure 7:
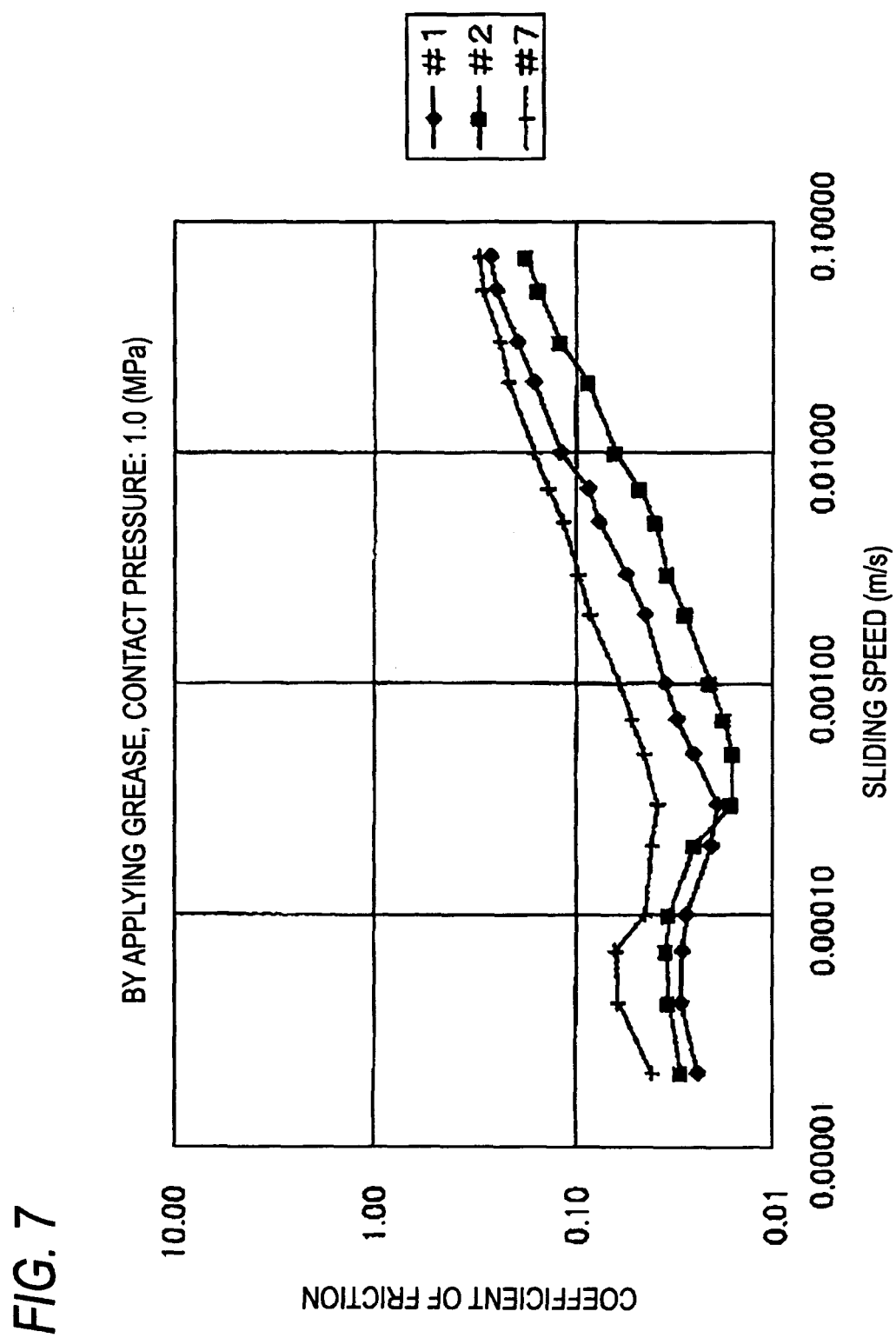
FIG. 7 is a graph showing a relationship between a sliding speed and a coefficient of friction when a contact pressure of a sample made of a rubber composition obtained in Example 1 is 1.0 MPa, and grease is applied.

[FIG. 4]
BY WIPING OFF GREASE, CONTACT PRESSURE: 1.0 (MPa)
COEFFICIENT OF FRICTION
SLIDING SPEED (m/s)
[FIG. 5]
BY APPLYING GREASE, CONTACT PRESSURE: 0.2 (MPa)
COEFFICIENT OF FRICTION
SLIDING SPEED (m/s)
[FIG. 6]
BY APPLYING GREASE, CONTACT PRESSURE: 0.5 (MPa)
COEFFICIENT OF FRICTION
SLIDING SPEED (m/s)
[FIG. 7]
BY APPLYING GREASE, CONTACT PRESSURE: 1.0 (MPa)
COEFFICIENT OF FRICTION
SLIDING SPEED (m/s)
[FIG. 8]
COEFFICIENT OF FRICTION
CONTENT OF METAL SOAP (% BY MASS)
NO ADDITIVE
[FIG. 9]
COEFFICIENT OF FRICTION
CONTENT OF ORGANIC ACID AMIDE (% BY MASS)
NO ADDITIVE
[FIG. 10]
COEFFICIENT OF FRICTION
CONTENT OF ORGANIC ACID AMIDE (% BY MASS)
NO ADDITIVE
[FIG. 11]
COEFFICIENT OF FRICTION
CONTENT OF OIL-CONTAINING PARTICLE (% BY MASS)
NO ADDITIVE
[FIG. 12]
COEFFICIENT OF FRICTION
CONTENT OF OIL-CONTAINING PARTICLE (% BY MASS)
[FIG. 13]
COEFFICIENT OF FRICTION
CONTENT OF OIL-CONTAINING PARTICLE (% BY MASS)
[FIG. 14]
COEFFICIENT OF FRICTION
CONTENT OF OIL-CONTAINING PARTICLE (% BY MASS)
[FIG. 15]
ROTATIONAL TORQUE (mN·m)
ROTATIONAL SPEED (min$^{-1}$)
CURRENT RUBBER
EXAMPLE

The invention claimed is:

1. A sealing device, including:
a first member;
a second member moving relative to the first member; and
an elastic member fixed to the first member and sliding against the second member,
wherein the elastic member comprises a rubber composition comprising a metal soap, an organic acid amide, and an oil-containing particle.

2. The sealing device according to claim 1, wherein the metal soap comprises lithium stearate.

3. The sealing device according to claim 1, wherein a content of the metal soap is 0.05% by mass or more.

4. The sealing device according to claim 1, wherein the organic acid amide comprises an unsaturated fatty acid monoamide.

5. The sealing device according to claim 4, wherein the unsaturated fatty acid monoamide comprises oleic acid monoamide.

6. The sealing device according to claim 1, wherein a content of the organic acid amide is 0.5% by mass or more.

7. The sealing device according to claim 1, wherein the oil-containing particle comprises a silicone oil-supported silica particle.

8. The sealing device according to claim 1, wherein a content of the oil-containing particle is 0.5% by mass or more.

9. The sealing device according to claim 1, wherein the organic acid amide comprises oleic acid monoamide.

10. The sealing device according to claim 1, wherein the organic acid amide comprises one of an unsaturated fatty acid monoamide, a saturated fatty acid bisarnide, and a substituted amide.

11. The sealing device according to claim 1, wherein the organic acid amide comprises one of oleic; acid monoarnide, ethylenebisstearic acid amide, and N-stearyl erucic acid amide.

12. The sealing device according to claim 1, wherein a content of the organic acid amide is 1% by mass or more.

13. The sealing device according to claim 1, wherein a content of the organic acid amide is in a range from 1% by mass to 2% by mass.

\* \* \* \* \*